United States Patent
Fujimoto

(10) Patent No.: US 7,176,590 B2
(45) Date of Patent: Feb. 13, 2007

(54) SPIRAL LINEAR MOTOR

(75) Inventor: Yasutaka Fujimoto, Kanagawa (JP)

(73) Assignee: Yokohama TLO Company, Ltd., Kanagawa (JP)

( * ) Notice: Subject to any disclaimer, the term of this patent is extended or adjusted under 35 U.S.C. 154(b) by 1 day.

(21) Appl. No.: 10/533,955

(22) PCT Filed: Oct. 24, 2003

(86) PCT No.: PCT/JP03/13646

§ 371 (c)(1),
(2), (4) Date: May 4, 2005

(87) PCT Pub. No.: WO2004/042902

PCT Pub. Date: May 21, 2004

(65) Prior Publication Data

US 2005/0269893 A1    Dec. 8, 2005

(30) Foreign Application Priority Data

Nov. 5, 2002 (JP) .............................. 2002-320965

(51) Int. Cl.
*H02K 41/06* (2006.01)
*H02K 1/00* (2006.01)
(52) U.S. Cl. ........................................ 310/12; 310/216
(58) Field of Classification Search ............ 310/11–14, 310/216, 261, 254, 49 R
See application file for complete search history.

(56) References Cited

U.S. PATENT DOCUMENTS

| 2,940,393 | A | * | 6/1960 | Baker | ........................ 417/50 |
| 4,286,180 | A | * | 8/1981 | Langley | ........................ 310/12 |
| 4,712,027 | A | * | 12/1987 | Karidis | ........................ 310/12 |
| 5,081,381 | A | * | 1/1992 | Narasaki | ........................ 310/12 |

FOREIGN PATENT DOCUMENTS

| JP | 57-501458 | | 8/1982 | | |
| JP | 62-38080 | | 3/1987 | | |
| JP | 63-31462 | * | 2/1988 | ............... | 310/49 R |
| JP | 63-121466 | * | 5/1988 | ............... | 310/49 R |
| JP | 6-225513 | | 8/1994 | | |
| JP | 7-9061 | | 2/1995 | | |
| JP | 8-163857 | | 6/1996 | | |
| JP | 10-257751 | | 9/1998 | | |

* cited by examiner

*Primary Examiner*—Tran Nguyen
(74) *Attorney, Agent, or Firm*—Westerman, Hattori, Daniels & Adrian, LLP.

(57) ABSTRACT

A motor producing a rectilinear drive force can be simultaneously provided with a small size and a lightweight, high accuracy and a large drive force.

In a spiral linear motor 1, a rotator 3 and stator 2 are both constituted having a spiral shape and, by joining together both spiral-shaped parts, a drive force is produced in the axial direction during rotation in a spiral shape. By affording the spiral linear motor a spiral shape, a large drive force can be obtained similarly to that of a reduction gear and a large drive force can be obtained by utilizing a large area that lies opposite in the axial direction of the rotator and stator.

4 Claims, 22 Drawing Sheets

CROSS-SECTIONAL VIEW OF SPIRAL MOTOR

STATOR ON WHICH WINDING IS WOUND

AXIAL PROJECTION OF STATOR AND WINDING

STATOR

AXIAL PROJECTION OF ROTATOR

STATOR AND ROTATOR OF SPIRAL LINEAR MOTOR

CUT MODEL OF SPIRAL MOTOR

CROSS-SECTIONAL VIEW OF SPIRAL MOTOR

POLE COORDINATE INTERIOR ELEVATION

EQUIVALENCE MAGNETIC CIRCUIT OF MODE 1

EQUIVALENCE MAGNETIC CIRCUIT OF MODE 2

DRIVE FORCE/TORQUE TO CURRENT CONVERTER

SCREW PRINCIPLE

DETAIL OF DRIVE FORCE CONTROL SYSTEM

DETAIL OF POSITION CONTROL SYSTEM

SPIRAL LINEAR MOTOR

TECHNICAL FIELD

The present invention relates to a spiral linear motor in which a rotator moves linearly in an axial direction with respect to a stator.

BACKGROUND ART

In cases where precise alignment is performed while receiving an external force in the case of an NC mechanism or the like, a large drive force and high rigidity are required. In order to obtain this large drive force, a method for reducing the output of the motor by means of gears and a direct drive system utilizing a large magnetic field are known.

In cases where a large drive force is obtained by reducing the output of the motor by means of gears, there is a problem that a coulomb frictional force as a result of the gears has a great effect on the alignment accuracy and, in cases where a large drive force is obtained by means of the direct drive system, there is the problem that the device then becomes large.

In the case of a linear actuator in particular, a constitution that combines a rotational motor and ball screw as a system that uses gears is known. However, in addition to the problem of alignment accuracy, a constitution that combines a rotational motor and ball screw is confronted by the problem that the device then becomes complex. Further, a constitution that utilizes a linear motor as a linear actuator of the direct drive system is known.

Furthermore, as a motor that produces a rectilinear drive force, a spiral motor, in which N poles and S poles are alternately magnetized at equal intervals in a spiral shape on a cylindrical surface to produce a rotator and a magnetic coil is disposed around the circumference on a plane that lies perpendicular to the axial direction to produce a stator, has been proposed. For example, a spiral motor of this kind is proposed in Japanese Patent Application Laid Open No. H9-56143.

A conventional motor constitution is confronted by the problem that the device becomes complex in order to obtain a large drive force. Further, in the case of the spiral motor proposed in Japanese Patent Application Laid Open No. H9-56143, the drive force is dependent on the area that lies opposite of the magnetic coil and outer circumferential face of the rotator. There is therefore the problem that it is difficult to obtain a large drive force.

Therefore, conventionally, in the case of a constitution that is known as a motor that produces a rectilinear drive force, there is the problem that it is not possible to simultaneously provide the motor with a small size and light weight, high accuracy and a large drive force.

Therefore, the present invention solves the conventional problems mentioned above and it is an object thereof to be able to simultaneously provide a motor that produces a rectilinear drive force with a small and light weight, high accuracy and a large drive force.

DISCLOSURE OF THE INVENTION

The present invention constitutes a linear motor that is simultaneously provided with a small size and light weight, high accuracy and a large drive force by integrating a screw mechanism that converts rotational motion to translational motion with an electromagnetic-force power mechanism.

The present invention removes the effect of friction by rendering the screw mechanism a contactless electromagnetic-force screw mechanism, whereby highly accurate alignment control is possible. Further, because the area of the screw mechanism part exerting the electromagnetic force can be increased, the magnetic flux can be utilized effectively and a drive force that is larger than that of a conventional linear motor of the same volume and same weight can be obtained.

The spiral linear motor of the present invention constitutes a rotator and stator in a spiral shape and, by mutually combining the two spiral-shaped parts, produces a drive force in the axial direction while rotating in a spiral shape. By establishing a spiral shape, a large drive force similar to that of a reduction gear can be obtained and a large drive force can be obtained by utilizing the large area that lies opposite in the axial direction of the rotator and stator.

Further, by reducing the pitch of the rotator and stator, the motor can be rendered a high-rotation-type motor and afforded a small size and light weight.

Furthermore, because there is no contact between the rotator and stator, the effect of friction is reduced and highly precise alignment is possible.

The spiral motor of the present invention has a constitution comprising a rotator that comprises a center shaft and a spiral-shaped portion provided on the outer circumference of the center shaft; and a stator comprising spiral-shaped hollow magnetic poles forming a center space with the same pitch as the rotator, wherein the center shaft of the rotator is within the hollow magnetic poles forming a center space of the stator. Further, the spiral-shaped portion of the rotator is rotatable in a spiral shape within a spiral-shaped groove of the hollow magnetic poles forming a center space of the stator, and the rotator moves linearly in the axial direction while rotating in a spiral shape with respect to the stator.

In the case of a spiral linear motor with this constitution, the spiral-shaped portion of the rotator formed with the same spiral shape with the groove of the stator moves linearly in the axial direction rotating in a spiral shape in the same way as a screw mechanism inside of the groove of the stator formed in a spiral shape.

The rotator of the spiral linear motor of the present invention comprises a permanent magnet on the spiral side face of the spiral-shaped portion of the rotator. Further, the stator of the spiral linear motor of the present invention has windings of two phases that are mutually displaced through 90 degrees on both spiral-shaped side faces of the hollow magnetic poles forming a center space wound in the axial direction of the stator. Furthermore, the stator comprises an uneven portion on both spiral-shaped side faces of the hollow magnetic poles forming a center space and windings are wound on the uneven portion.

The torque and drive force of the spiral linear motor of the present invention are produced by the intersecting electromagnetic forces between the spiral-shaped side face of the mutually opposite magnetic poles of the rotator and stator and can be controlled independently of one another.

BEST MODE FOR CARRYING OUT THE INVENTION

An embodiment of the present invention will be described in detail hereinbelow with reference to the drawings.

The stator of the spiral linear motor of the present invention will be described by using FIGS. 1 to 4, the rotator of the spiral linear motor of the present invention will be described by using FIGS. 5 to 7, and each structure of a combination of rotator and stator of the spiral linear motor of the present invention will be described by using FIGS. 8 to 10. Further, the principles of the production of the drive force of the spiral linear motor of the present invention will be described by using FIGS. 11 to 15, the armature circuit of the spiral linear motor of the present invention will be described by using FIG. 16, and the control of the spiral linear motor of the present invention will be described by using FIGS. 17 to 22.

The spiral linear motor 1 of the present invention comprises a stator 2 and rotator 3 and the rotator 3 moves linearly in an axial direction while undergoing spiral-shaped rotation with respect to the stator 2.

Figure 1:
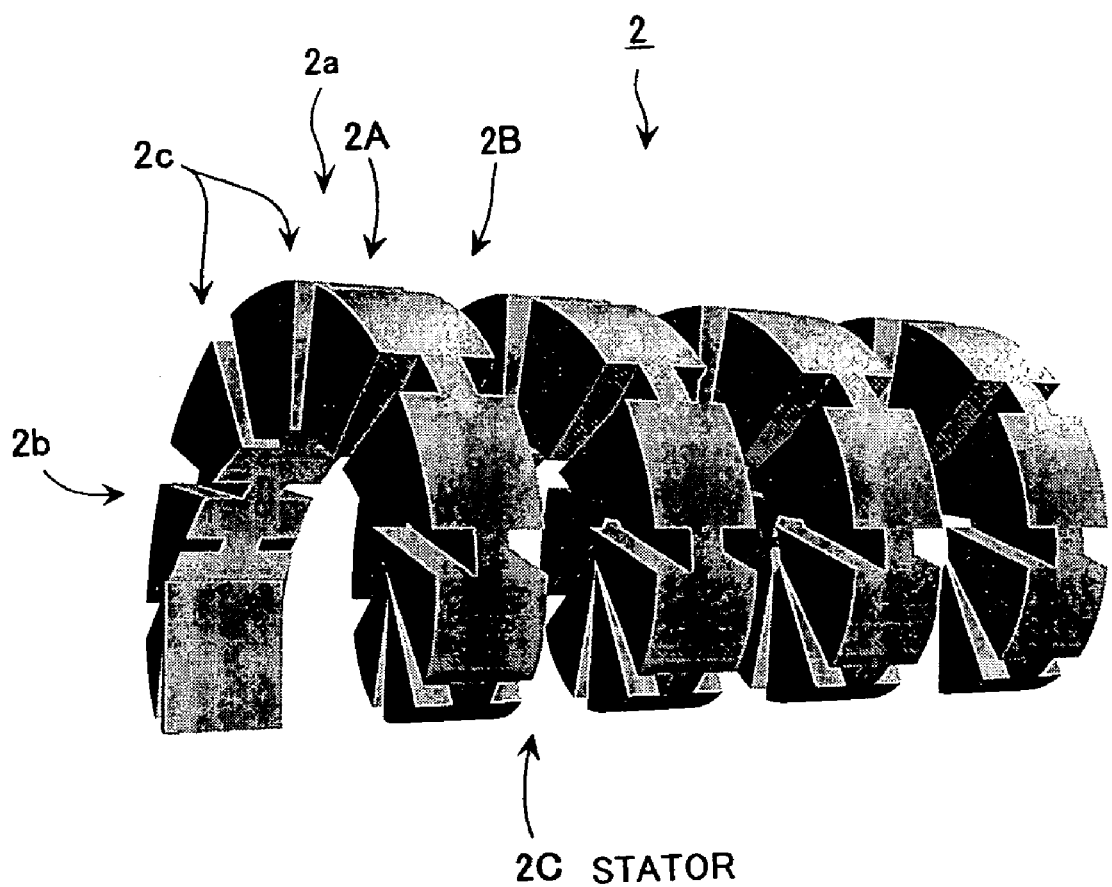
FIG. 1 shows the overall constitution of the stator of the spiral linear motor of the present invention.

FIG. 1 shows the overall constitution of the stator 2 of the present invention. The stator 2 comprises a hollow hole 2b in an axial direction and comprises a spiral-shaped magnetic pole 2a formed with a predetermined pitch in the axial direction. The magnetic pole 2a formed in a spiral shape has a side 2A and a side 2B in the axial direction and a spiral-shaped groove 2C with the same pitch is formed between sides 2A and 2B of the magnetic pole 2a that adjoin each other in the axial direction. The spiral-shaped portion of the rotator 1 of the present invention is provided in the spiral-shaped groove 2C so as to be capable of spiral-shaped rotation.

Furthermore, a slot 2c with a recess in the axial direction is formed in the spiral direction on sides 2A and 2B of the magnetic pole 2a. Windings for forming a magnetic field are wound in the slot 2c.

Figure 2:
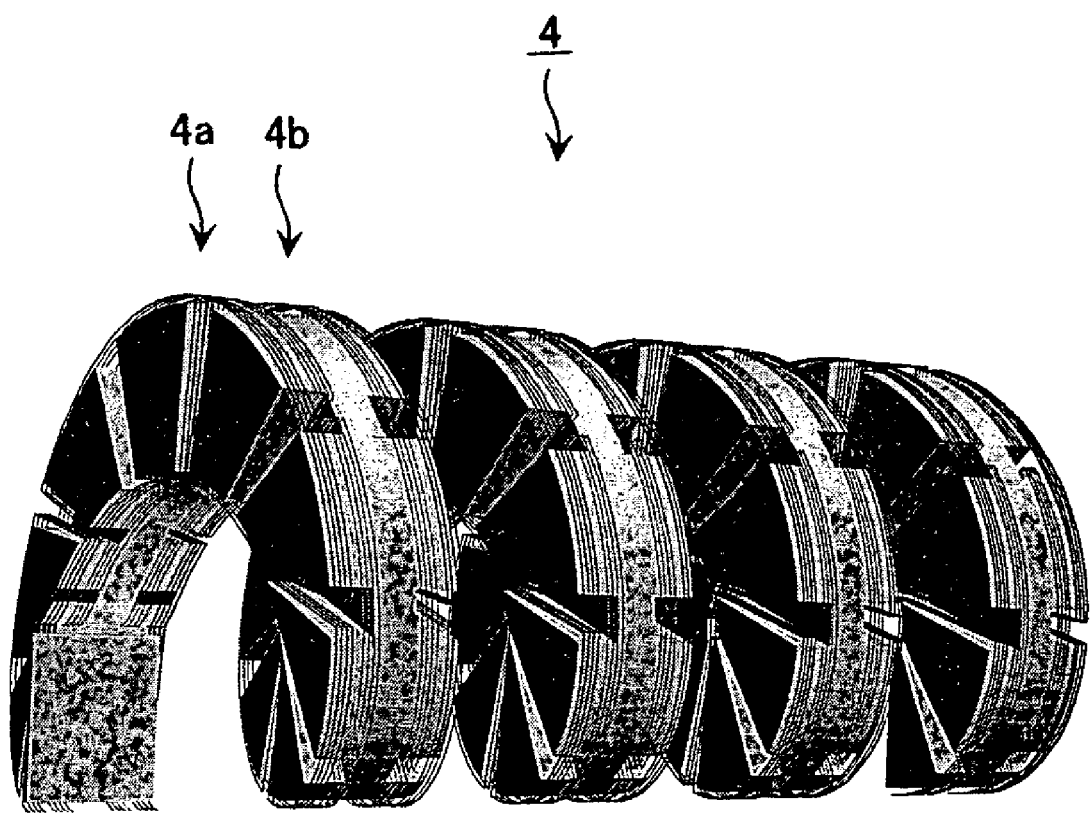
FIG. 2 is a schematic view of the stator in a state where windings have been wound of the spiral linear motor of the present invention.

FIG. 2 shows a stator where windings have been wound in the slot 2c. Two phases of windings 4 are wound on the stator 2. Windings 4a of one phase are wound in the axial direction in the slot 2c that is formed in the side 2A of the magnetic pole 2a, for example. Windings of 4b of the other phase are wound in the axial direction in the slot 2c that is formed on the side 2B of the magnetic pole 2a, for example. The windings 4a wound on the side 2A and the windings 4b wound on the side 2B are wound with a 90 degree shift with respect to one another.

Figure 3A:
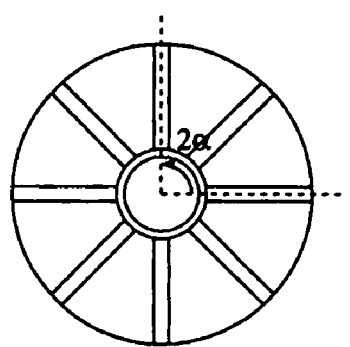
FIG. 3 serves to illustrate the phase state of two phases of windings that are wound on the stator of the present invention.

FIG. 3 serves to illustrate the phase state of the two phases of windings that are wound on the stator 2. FIG. 3A shows a state where the stator is projected in the axial direction. Further, a case with four poles is shown here. The slots 2c in which the windings are wound are formed at intervals of angle a in the circumferential direction and the windings of each phase are wound with respect to two slots. As a result, the windings of each phase are wound in units of the angle 2a.

Figure 3B:
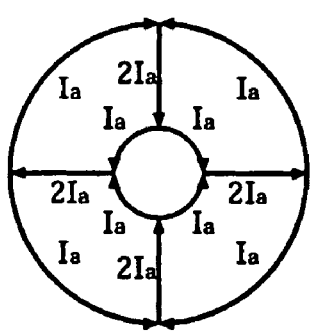
Figure 3C:
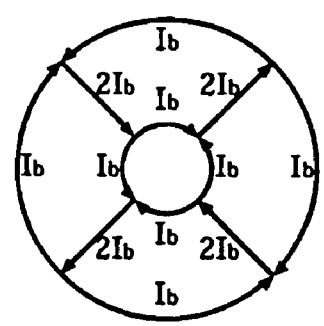

Further, when the respective phases are assumed to be phase a and phase b, phases a and b are wound shifted by the angle a. FIG. 3B shows the flow of current as a result of the winding of phase a, for example, and FIG. 3C shows the flow of current as a result of the winding of phase b, for example. The phases of the current of phase a and the current of phase b are mutually shifted through the angle a.

Figure 4A:
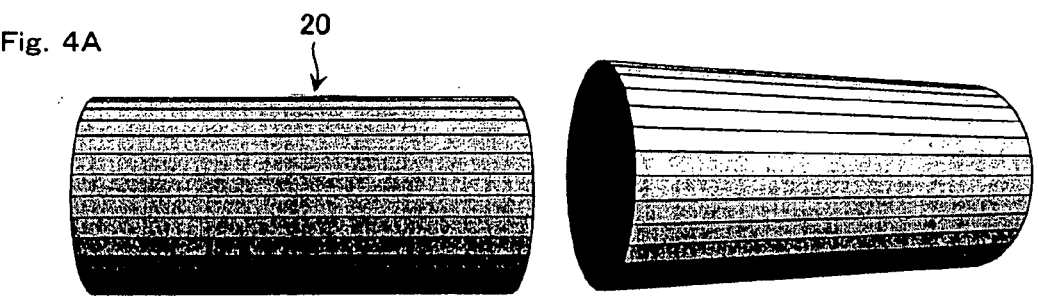
FIG. 4 is a schematic view serving to illustrate an example of the stator creation procedure of the present invention.
Figure 4B:
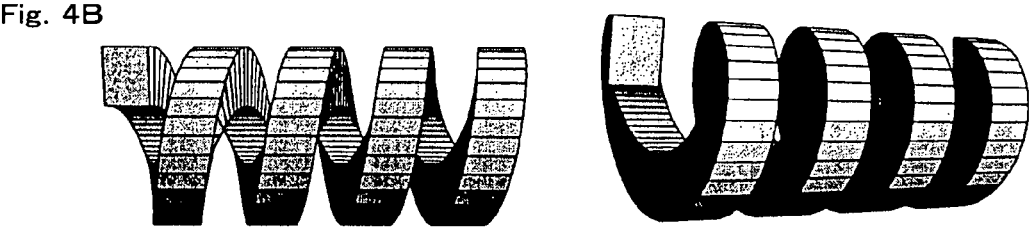
Figure 4C:
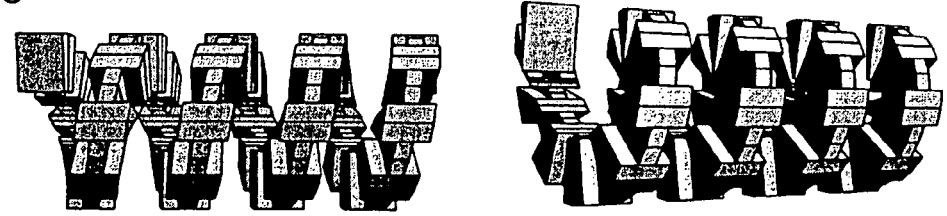

FIG. 4 is a schematic view serving to illustrate an example of the stator creation procedure. Further, the two drawings in FIGS. 4A to 4C show a state where stators in the same state are viewed from different angles.

First, a cylindrical member is formed by laminating disk-like electromagnetic steel sheets. The electromagnetic steel sheets can be silicon steel sheets. FIG. 4A shows the external form of the laminated electromagnetic steel sheets. Thereafter, the laminated electromagnetic steel sheets are cut into a spiral shape as shown in FIG. 4B, whereby a spiral-shaped magnetic pole part is formed. In addition, the spiral-shaped magnetic pole part is cut to form a slot for winding windings. Further, in order to prevent abnormal torque of higher harmonic asynchronous torque, the spiral-shaped magnetic pole part may be cut obliquely to provide a skew.

Figure 5:
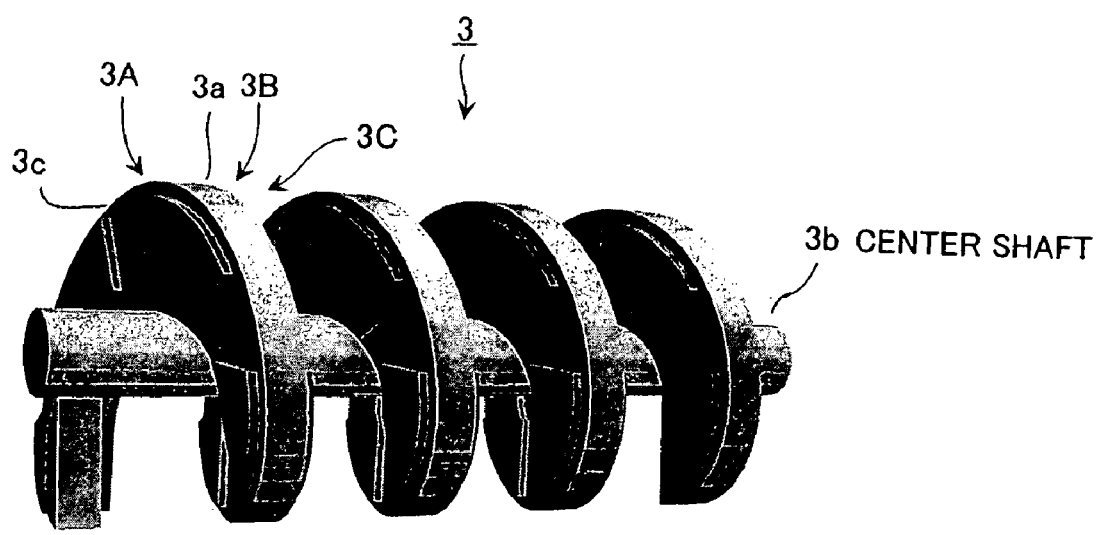
FIG. 5 shows the overall constitution of the rotator of the spiral linear motor of the present invention.

FIG. 5 shows the overall constitution of the rotator 3 of the present invention. The rotator 3 comprises a center shaft 3b, and a spiral-shaped portion 3a that is formed in a spiral shape with a predetermined pitch in the axial direction of the center shaft 3b. The spiral-shaped portion 3a has a side 3A and a side 3B in the axial direction thereof and a spiral-shaped groove 3C with the same pitch is formed between sides 3A and 3B of the spiral-shaped portion 3a that adjoin each other in the axial direction. Permanent magnets 3c are then attached to the faces of sides 3A and 3B of the spiral-shaped portion 3a.

Figure 6:
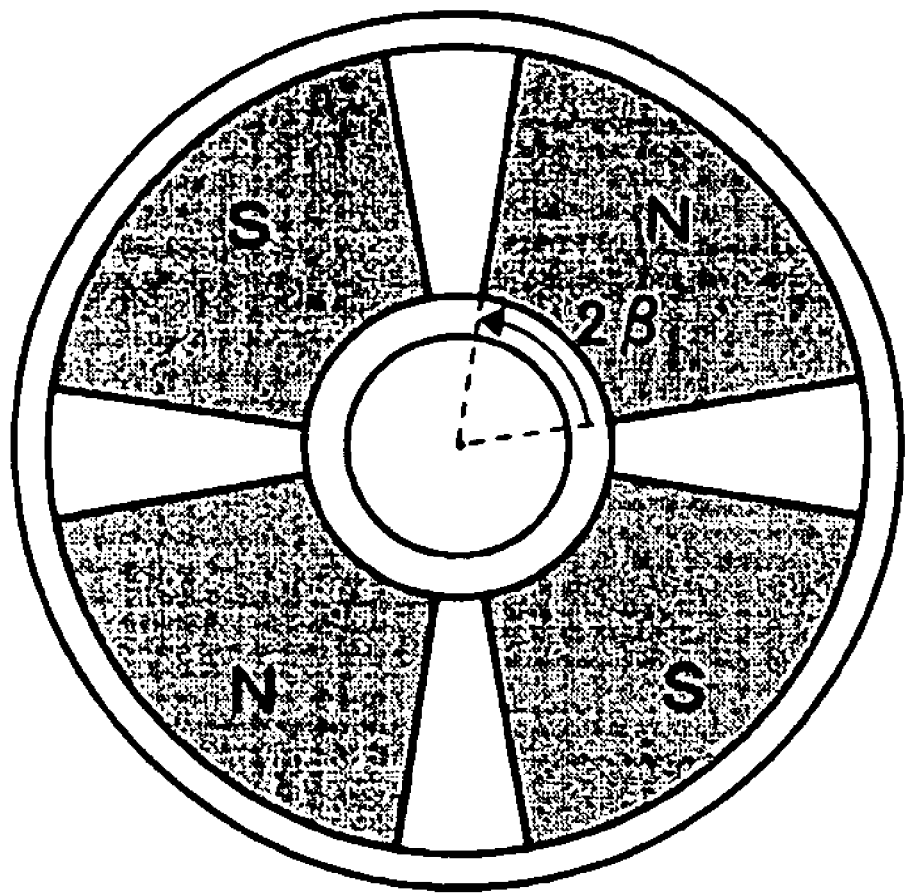
FIG. 6 is a view in which the rotator of the present invention is projected in an axial direction.

FIG. 6 is a view in which the rotator is projected in the axial direction. FIG. 6 shows an example with four poles where permanent magnets 3c with N and S magnetic poles are alternately attached at 90-degree intervals. The permanent magnets 3c can be attached through adhesion to sides 3A and 3B.

Figure 7A:
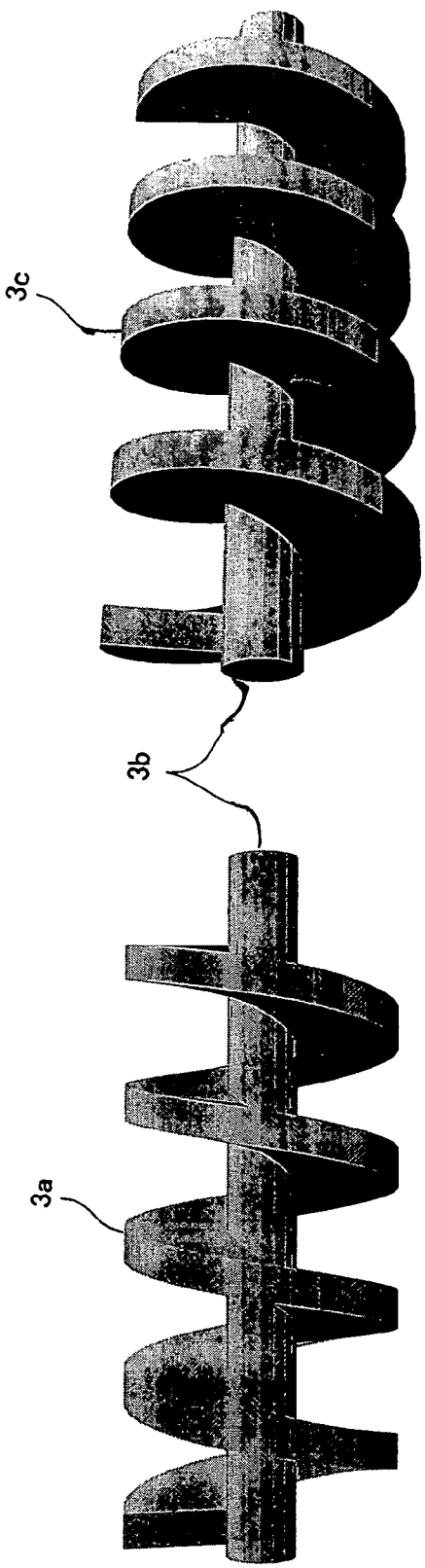
FIG. 7 is a schematic view that serves to illustrate an example of the rotator creation procedure of the present invention.
Figure 7B:
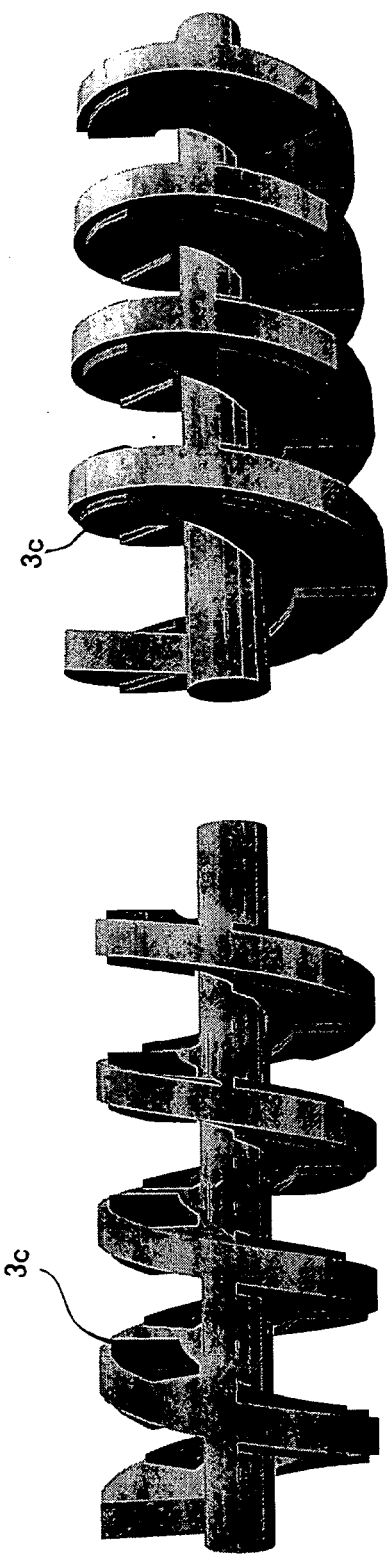

FIG. 7 is a schematic view that serves to illustrate an example of the rotator creation procedure. Further, the two diagrams in FIGS. 7A to 7B show states in which stators in the same state are view from different angles. First, a center shaft 3b and spiral-shaped portion 3a are formed by cutting and processing the cylindrical member. FIG. 7A shows the external form of the center shaft 3b and spiral-shaped portion 3a that are formed as a result of cutting and processing. The pitch of the spiral-shaped portion 3a of the rotator 3 is formed with the same pitch as the pitch of the spiral-shaped groove 2C of the stator 2. Thereafter, as shown in FIG. 7B, permanent magnets 3c are made to adhere to the 3A and 3B on both sides in the axial direction of the spiral-shaped portion 3a thus formed.

The spiral linear motor 1 of the present invention can be constituted by inserting the rotator 3 in the stator 2, supporting both ends of the center shaft 3b of the rotator 3, and supporting the stator 2 by means of a frame. Further, the frame can be formed by means of an aluminum member or the like.

Figure 8:
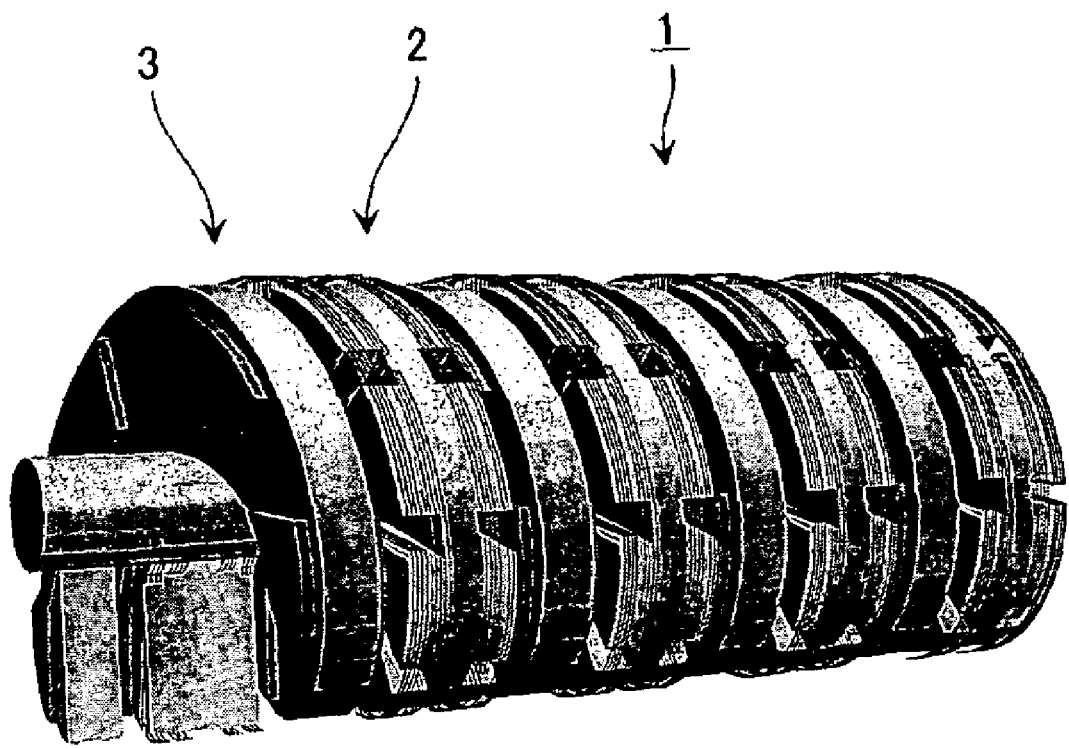
FIG. 8 shows a state where the rotator is inserted in the stator of the present invention as seen from the outside.
Figure 9:
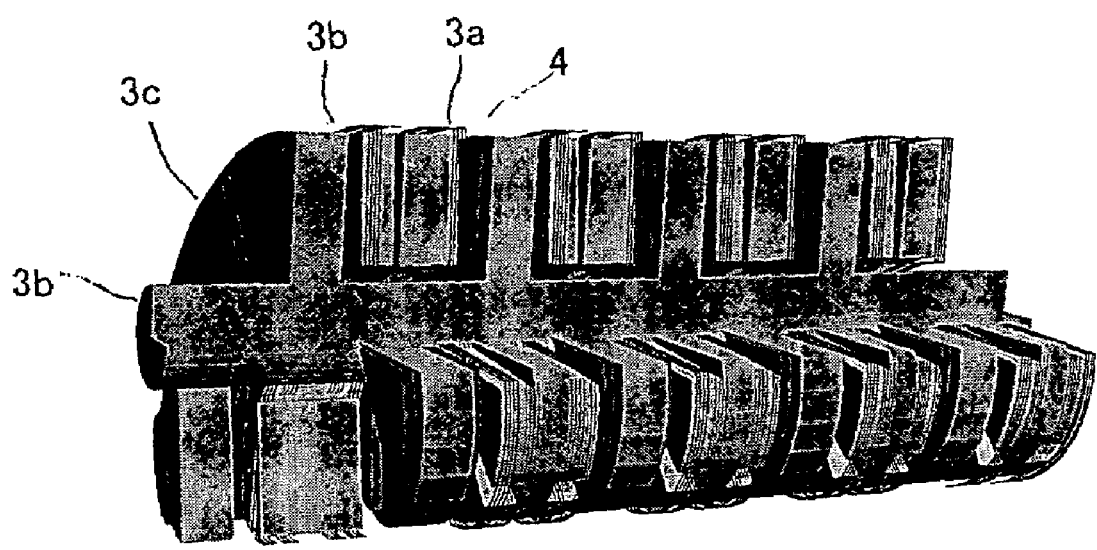
FIG. 9 shows a state where the rotator is inserted in the stator of the present invention.

FIG. 8 shows a state where the rotator 3 is inserted in the stator 2 of the present invention as seen from the outside. FIG. 9 similarly shows an internal state with part of the state where the rotator 3 is inserted in the stator 2 of the present invention removed.

The spiral-shaped portion 3a of the rotator 3 is inserted in the spiral-shaped groove 2C of the stator 2 so as to be rotatable in a spiral shape therein and the spiral-shaped magnetic pole 2a of the stator 2 is attached inserted in the spiral-shaped groove 3C of the rotator 3 so as to be rotatable therein a spiral shape.

Further, the slot 2c formed having an axial recess is formed in the spiral direction on sides 2A and 2B of the magnetic pole 2a of the stator 2. Windings 4 for forming a magnetic field are wound in the slot 2c. A magnetic field is formed at the magnetic pole 2a by supplying a current to the windings 4 and an axial drive force and rotational torque are formed by the mutual action of the magnetic field formed on the side of the stator 2 and the magnetic field exerted by the permanent magnet 3c of the rotator 3.

In the case of the spiral linear motor of the present invention, the rotational force is controlled while keeping the gap in the axial direction between the stator 2 and rotator 3 at a constant value. The rotator 3 advances in a spiral shape with respect to the stator 2 and the center shaft 3b of the rotator 3, which is an output shaft, operates as a translation mechanism.

Figure 10:
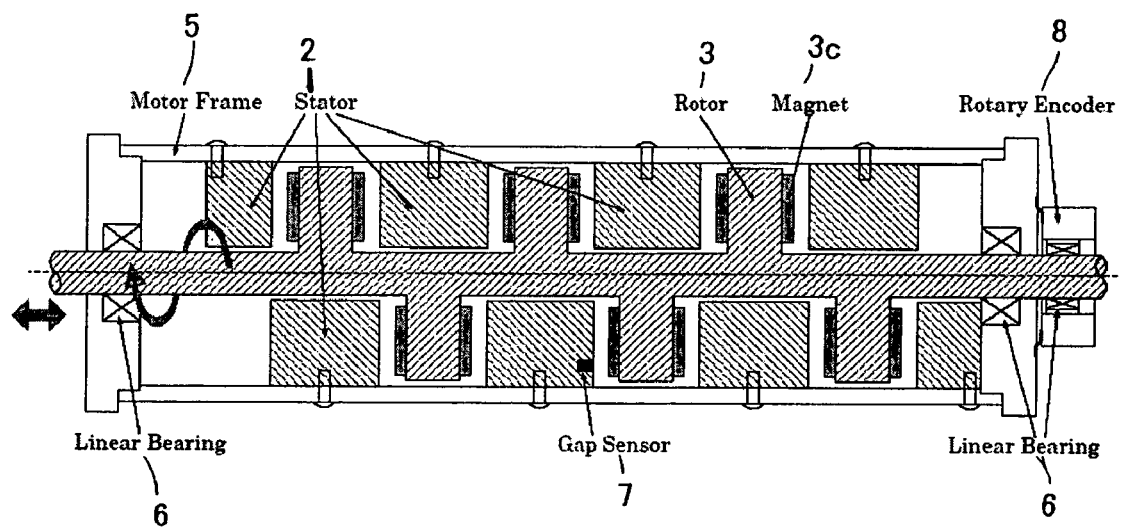
FIG. 10 is a vertical cross-sectional view of the spiral linear motor of the present invention.

FIG. 10 is a vertical cross-sectional view of the spiral linear motor of the present invention. The spiral linear motor 1 of the present invention comprises, at the circumference thereof, a motor frame 5 that supports the stator 2. In FIG. 10, the stator 2 is supported by fixing the outer circumferential face of the magnetic pole 2a of the stator 2 to the inner circumferential face of the motor frame 5. In addition to using screws, the fixation may be performed by using an adhesive.

The rotator 3 is also rotatably supported on the motor frame 5 by means of linear bearings 6. The linear bearings 6 are attached by means of a support member that is provided at both ends of the motor frame 5 and rotatably supports both end parts of the center shaft 3b of the rotator 3.

A gap sensor 7 is attached to the side part of the stator 2 in order to detect the gap from the side face of the rotator 3. Further, a rotary encoder 8 is attached to detect the rotational speed of the rotator 3.

The principles of the production of the drive force of the spiral linear motor of the present invention will be described next.

Figure 11:
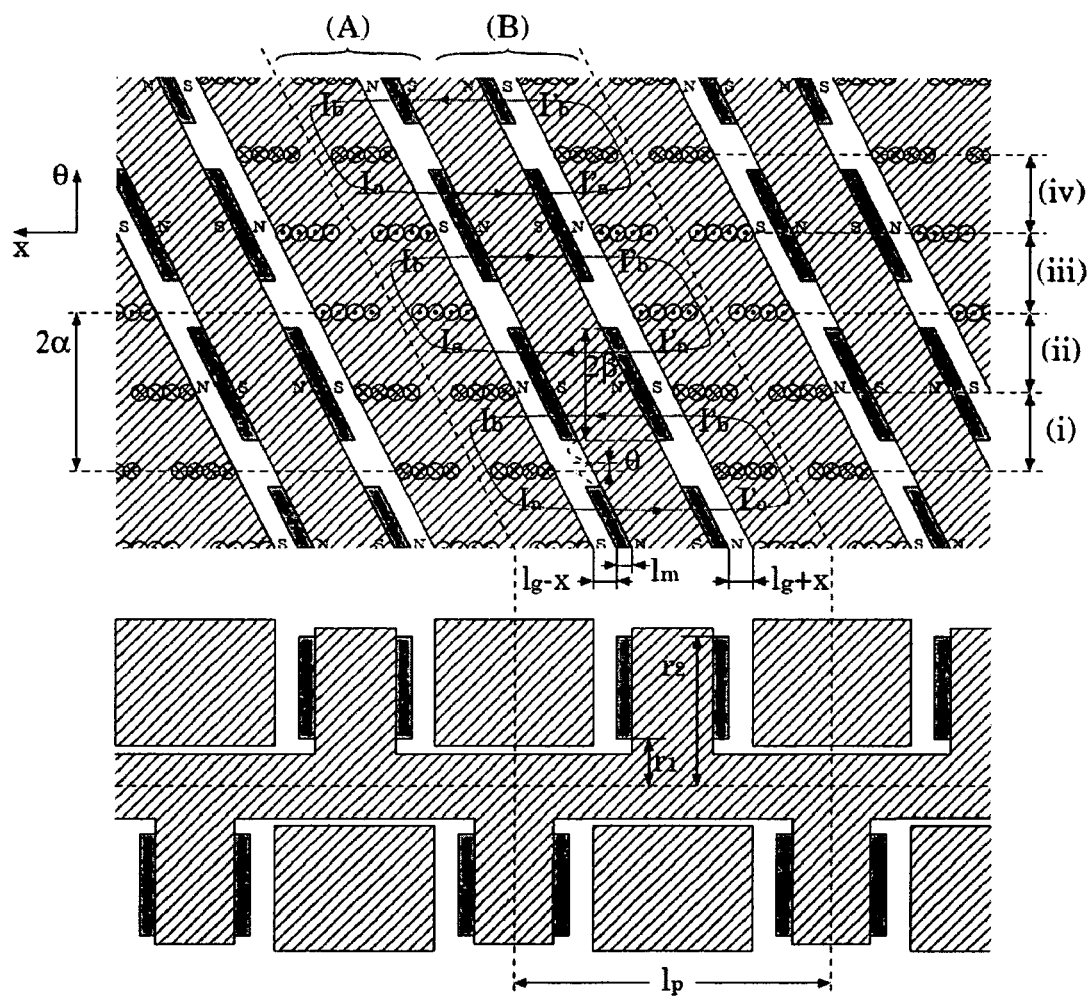
FIG. 11 is a pole coordinate interior elevation of the spiral linear motor of the present invention.

FIG. 11 is a pole coordinate interior elevation of the spiral linear motor of the present invention. In a view from the rotator 3 in the pole coordinate interior elevation, the rotator 3 is held from both sides by the magnetic poles of the two stators 2. A closed magnetic path in which the rotator 3 is inserted is formed by supplying currents $I_a$ and $I_b$, the phases of which are shifted 90 degrees, to the adjoining windings provided on the magnetic poles and the permanent magnet 3 provided on the rotator 3 receives the action of the magnetic field exerted by the closed magnetic path.

Here, in the pole coordinate interior elevation, suppose that the angle of the windings that are wound in the slot on the side of the stator 2 is 2a, the angle of the permanent magnet on the side of the rotator 3 is 2B, and the rotational angle of the rotator 3 with respect to the stator 2 is θ. Further, suppose that the gap between the sides of the stator 2 and rotator 3 is $l_g$, the thickness of the permanent magnet is $l_m$, the deviation of the rotator 3 in the groove of the stator 2 is x, the pitch of the stator and rotator is $l_p$, and the distance from the center shaft of the permanent magnet to the end portion in the radial direction is $r_1$ and $r_2$ respectively ($r_1 < r_2$).

Further, the parameters used here are shown in Table 1 below:

TABLE 1

| | parameter |
|---|---|
| $I_a$ [A] | A phase armature current of stator backward |
| $I_b$ [A] | B phase armature current of stator backward |
| $I'_a$ [A] | A phase armature current of stator forward |
| $I'_b$ [A] | B phase armature current of stator forward |
| n | turn number of armature winding |
| α [rad] | angle between slots of adjoining stators |
| β [rad] | angle of permanent magnet of rotator ÷2 |
| $l_m$ [m] | thickness of permanent magnet of rotator |
| $l_g$ [m] | basis value of gap between stator and rotator |
| $x_g$ [m] | displacement of gap between stator and rotator |
| θ [m] | rotate angle of rotator |
| $r_1$ [m] | interior diameter of permanent magnet |
| $r_2$ [m] | exterior diameter of permanent magnet |
| p | bipole number per one layer of spiral |
| q | layer number of spiral |
| $\mu_o$ | magnetic permeability of a vacuum |
| $\mu_m$ | magnetic permeability of permanent magnetic |
| $B_r$ [T] | residual magnetic permeability |
| $l_p$ [m] | pitch of spiral |

In the pole coordinate interior elevation, two different kinds of magnetic circuit model may be considered in accordance with the relative positional relationship between the magnetic field winding and permanent magnet.

The first magnetic circuit model (mode 1) represents a case where the permanent magnet extends over one winding.

Figure 12:
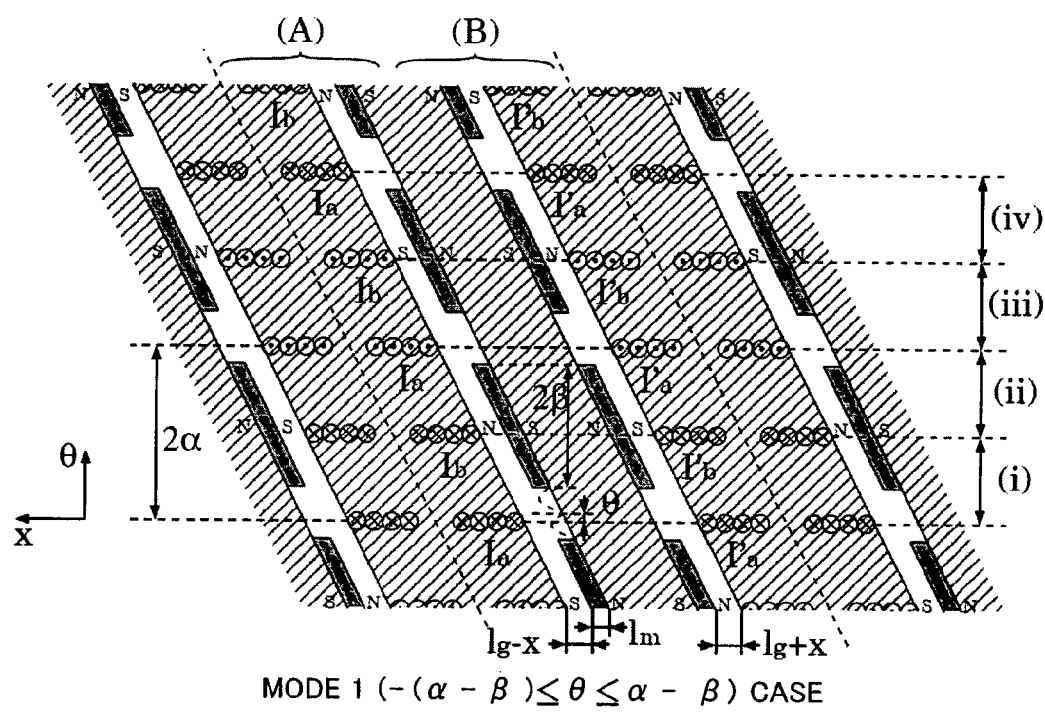
FIG. 12 is a pole coordinate interior elevation showing the state of the magnetic circuit model of mode 1 of the spiral linear motor of the present invention.
Figure 13:
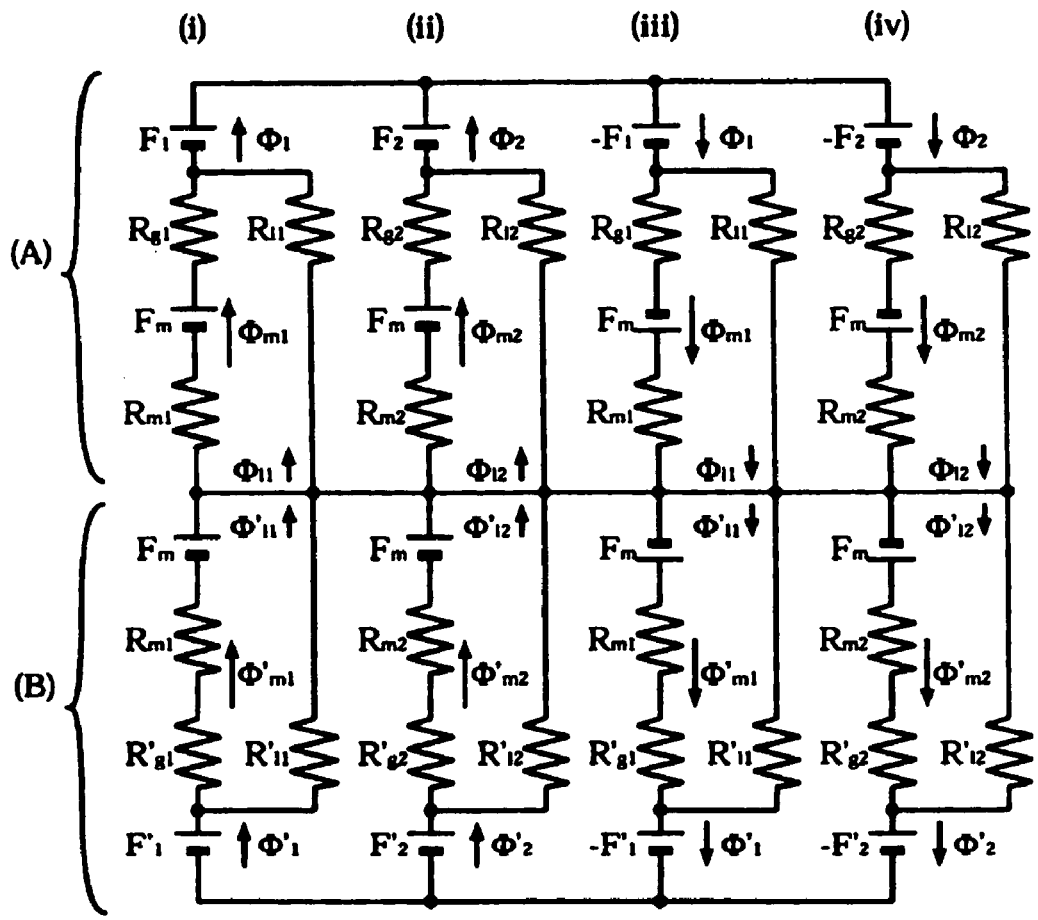
FIG. 13 is an equivalence magnetic circuit showing the state of the magnetic circuit model of mode 1 of the spiral linear motor of the present invention.

The pole coordinate interior elevation in FIG. 12 and the equivalence magnetic circuit in FIG. 13 show the state of the magnetic circuit model of mode 1.

Mode 1 is a case where $-(\alpha-\beta)=\theta=(\alpha-\beta)$ is established when the angle of rotation is $\theta$, and the parameters here are shown in Table 2 below.

TABLE 2 parameter of magnetic circuit of mode 1

| | |
|---|---|
| $F_m$ | magneto motive force of permanent magnet |
| $R_{m1}$ | magnetic resistance of permanent magnet in region (i) |
| $R_{m2}$ | magnetic resistance of permanent magnet in region (ii) |
| $\Phi_1$ | magnetic flux of region (i)-(A) |
| $\Phi_{m1}$ | magnetic flux of region with permanent magnet in region (i)-(A) |
| $\Phi_{l1}$ | magnetic flux of region without permanent magnet in region (i)-(A) |
| $\Phi_2$ | magnetic flux of region (ii)-(A) |
| $\Phi_{m2}$ | magnetic flux of region with permanent magnet in region (ii)-(A) |
| $\Phi_{l2}$ | magnetic flux of region without permanent magnet in region (ii)-(A) |
| $F_1$ | magneto motive force of armature winding in region (i)-(A) |
| $F_2$ | magneto motive force of armature winding in region (ii)-(A) |
| $R_{g1}$ | magnetic resistance of gap in region (i)-(A) |
| $R_{l1}$ | magnetic resistance of leak magnetic path in region (i)-(A) |
| $R_{g2}$ | magnetic resistance of gap in region (ii)-(A) |
| $R_{l2}$ | magnetic resistance of leak magnetic path in region (ii)-(A) |
| $\Phi'_1$ | magnetic flux of region (i)-(B) |
| $\Phi'_{m1}$ | magnetic flux of region with permanent magnet in region (i)-(B) |
| $\Phi'_{l1}$ | magnetic flux of region without permanent magnet in region (i)-(B) |
| $\Phi'_2$ | magnetic flux of region (ii)-(B) |
| $\Phi'_{m2}$ | magnetic flux of region with permanent magnet in region (ii)-(B) |
| $\Phi'_{l2}$ | magnetic flux of region without permanent magnet in region (ii)-(B) |
| $F'_1$ | magneto motive force of armature winding in region (i)-(B) |
| $F'_2$ | magneto motive force of armature winding in region (ii)-(B) |
| $R'_{g1}$ | magnetic resistance of gap in region (i)-(B) |
| $R'_{l1}$ | magnetic resistance of leak magnetic path in region (i)-(B) |
| $R'_{g2}$ | magnetic resistance of gap in region (ii)-(B) |
| $R'_{l2}$ | magnetic resistance of leak magnetic path in region (ii)-(B) |

Here, the magnetic flux of the regions (iii)-(A), (iv)-(A), (iii)-(B), (iv)-(B) due to the symmetry is $-\Phi_1$, $-\Phi_2$, $-\Phi'_1$, and $-\Phi'_2$. Further, the magnetomotive force of the armature winding is also similarly $-F_1$, $-F_2$, $-F'_1$, and $-F'_2$.

Figure 14:
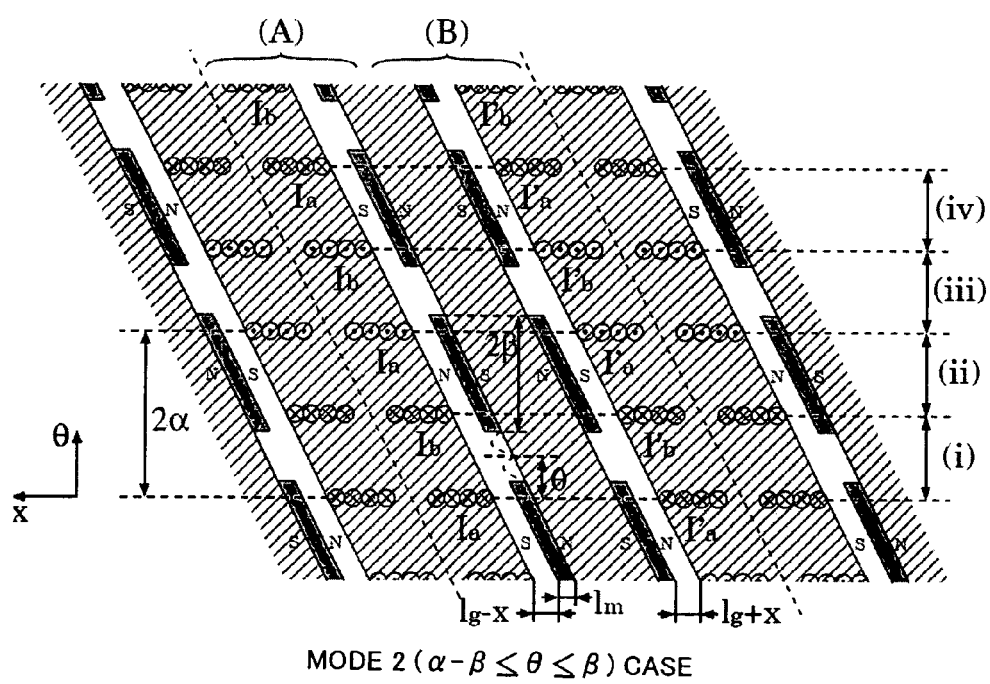
FIG. 14 is a pole coordinate interior elevation showing the state of the magnetic circuit model of mode 2 of the spiral linear motor of the present invention.
Figure 15:
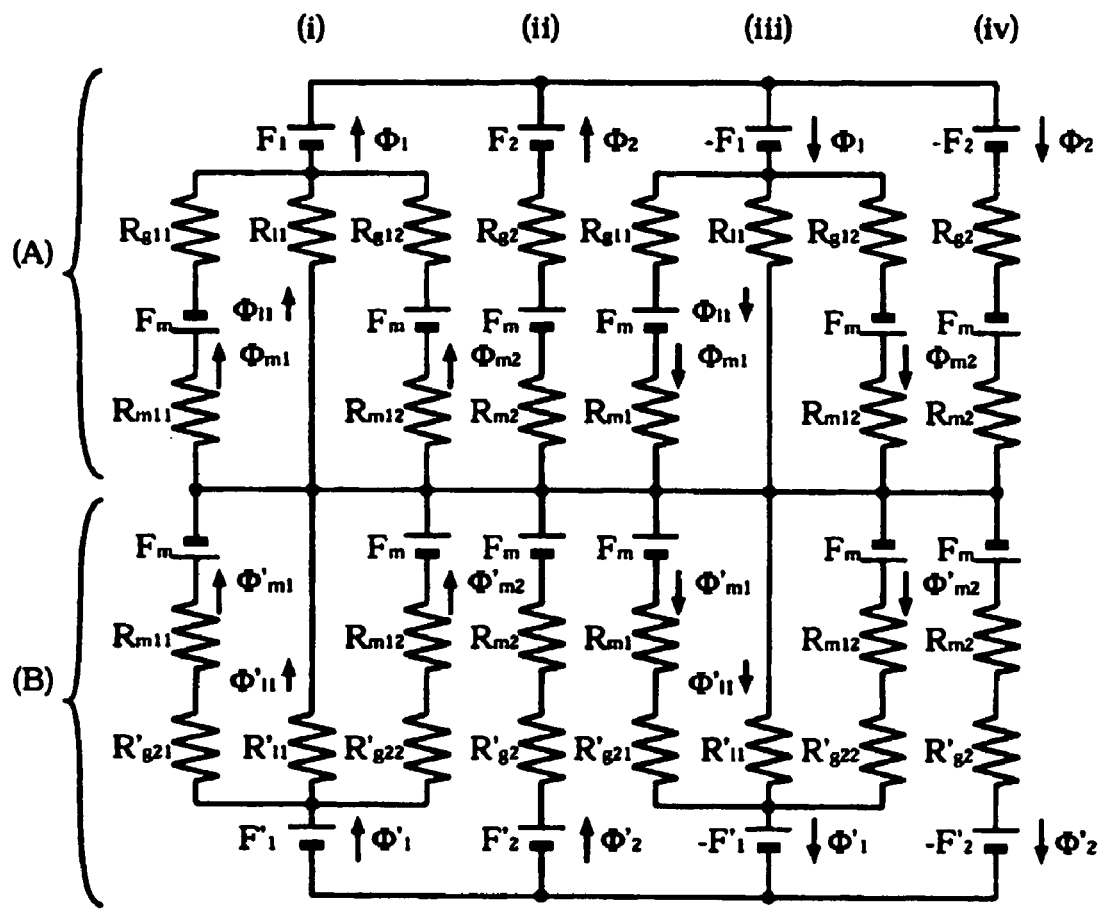
FIG. 15 is an equivalence magnetic circuit showing the state of the magnetic circuit model of mode 2 of the spiral linear motor of the present invention.

Furthermore, the second magnetic circuit model represents a case where the permanent magnet extends over two windings. The pole coordinate interior elevation in FIG. 14 and the equivalence magnetic circuit in FIG. 15 show states of the magnetic circuit model of mode 2.

In this mode 2, in a case where $(\alpha-\beta)=\theta=\beta$ is established when the rotational angle is $\theta$, the parameters here are shown in Table 3 below.

TABLE 3 parameter of magnetic circuit of mode 2

| | |
|---|---|
| $F_m$ | magneto motive force of permanent magnet |
| $R_{m1}$ | magnetic resistance of permanent magnet in region (i) |
| $R_{m2}$ | magnetic resistance of permanent magnet in region (ii) |
| $\Phi_1$ | magnetic flux of region (i)-(A) |
| $\Phi_{m1}, \Phi_{m2}$ | magnetic flux of region with permanent magnet in region (i)-(A) |
| $\Phi_{l1}$ | magnetic flux of region without permanent magnet in region (i)-(A) |
| $\Phi_2$ | magnetic flux of region (ii)-(A) |
| $F_1$ | magneto motive force of armature winding in region (i)-(A) |
| $F_2$ | magneto motive force of armature winding in region (ii)-(A) |
| $R_{g11}, R_{g12}$ | magnetic resistance of gap in region (i)-(A) |
| $R_{l1}$ | magnetic resistance of leak magnetic path in region (i)-(A) |
| $R_{g2}$ | magnetic resistance of gap in region (ii)-(A) |
| $\Phi'_1$ | magnetic flux of region (i)-(B) |
| $\Phi'_{m1}, \Phi'_{m2}$ | magnetic flux of region with permanent magnet in region (i)-(B) |
| $\Phi'_{l1}$ | magnetic flux of region without permanent magnet in region (i)-(B) |
| $\Phi'_2$ | magnetic flux of region (ii)-(B) |
| $F'_1$ | magnetic flux of region with permanent magnet in region (ii)-(B) |
| $F'_2$ | magneto motive force of armature winding in region (ii)-(B) |
| $R'_{g11}, R'_{g12}$ | magnetic resistance of gap in region (i)-(B) |
| $R'_{l1}$ | magnetic resistance of leak magnetic path in region (i)-(B) |
| $R'_{g2}$ | magnetic resistance of gap in region (ii)-(B) |

Here, the drive force in mode 1 is found. For the drive force in a case where the angle of rotation, is in the range $-(\alpha-\beta)=\theta=(\alpha-\beta)$, the magnetomotive forces $F_1$, $F_2$, $F'_1$, and $F'_2$ [A] of the armature windings in the regions (i) and (ii) and the magnetomotive force $F_m$ [A] exerted by the permanent magnet when the currents $I_a$ [A], $I_b$ [A], $I'_a$ [A], and $I'_b$ [A] flow in each phase of the armature winding as shown in FIG. 12 are expressed by equations (1) to (5) below.

$$F_1 = -n(I_a - I_b) \quad (1)$$

$$F_2 = -n(I_a + I_b) \quad (2)$$

$$F'_1 = -n(I'_a - I'_b) \quad (3)$$

$$F'_2 = -n(I'_a + I'_b) \quad (4)$$

$$F_m = \frac{B_r l_m}{\mu_m} \quad (5)$$

Where n represents the winding number. Further, $B'_r$ [T] represents the residual magnetic flux density of the permanent magnet and $\mu'_m$ represents the magnetic permeability thereof. Further, the respective magnetic resistance is expressed by following equations (6) to (15).

$$R_{g1} = \frac{-x_g + l_g}{(\beta - \theta)S_0 \mu_0} \quad (6)$$

$$R_{m1} = \frac{l_m}{(\beta - \theta)S_0 \mu_m} \quad (7)$$

$$R_{l1} = \frac{-x_g + l_g + l_m}{(\alpha - \beta + \theta)S_0 \mu_0} \quad (8)$$

$$R_{g2} = \frac{-x_g + l_g}{(\beta + \theta)S_0 \mu_0} \quad (9)$$

$$R_{m2} = \frac{l_m}{(\beta + \theta)S_0 \mu_m} \quad (10)$$

$$R_{l2} = \frac{-x_g + l_g + l_m}{(\alpha - \beta - \theta)S_0 \mu_0} \quad (11)$$

$$R'_{g1} = \frac{x_g + l_g}{(\beta - \theta)S_0 \mu_0} \quad (12)$$

$$R'_{l1} = \frac{x_g + l_g + l_m}{(\alpha - \beta + \theta)S_0 \mu_0} \quad (13)$$

$$R'_{g2} = \frac{x_g + l_g}{(\beta + \theta)S_0 \mu_0} \quad (14)$$

$$R'_{l2} = \frac{x_g + l_g + l_m}{(\alpha - \beta - \theta)S_0 \mu_0} \quad (15)$$

where $S_0 = (r_2^2 - r_1^2)/2$
is magnetic permeability of a vacuum.

When region (A) is viewed below, the equations for the magnetic circuit in region (A) are expressed by equations (16) to (21) below from FIG. 13.

$$-F_1 - F_m + R_{g1}\Phi_{m1} + R_{m1}\Phi_{m1} = 0 \tag{16}$$

$$-F_1 + R_{l1}\Phi_{l1} = 0 \tag{17}$$

$$\Phi_{l1} + \Phi_{m1} = \Phi_1 \tag{18}$$

$$-F_2 - F_m + R_{g2}\Phi_{m2} + R_{m2}\Phi_{m2} = 0 \tag{19}$$

$$-F_2 + R_{l2}\Phi_{l2} = 0 \tag{20}$$

$$\Phi_{l2} + \Phi_{m2} = \Phi_2 \tag{21}$$

As a result, when the magnetic flux penetrating the magnetic circuit is found, same is expressed by equations (22) to (27) below.

$$\Phi_{m1} = \frac{F_1 + F_m}{R_{g1} + R_{m1}} \tag{22}$$
$$= \frac{(\beta - \theta)S_0\mu_0(B_r l_m + n(-I_a + I_b)\mu_m)}{l_m\mu_0 + (-x_g + l_g)\mu_m}$$

$$\Phi_{l1} = \frac{F_1}{R_{l1}} \tag{23}$$
$$= -\frac{n(\alpha - \beta + \theta)(I_a - I_b)S_0\mu_0}{-x_g + l_g + l_m}$$

$$\Phi_1 = \frac{F_m R_{l1} + F_1(R_{g1} + R_{l1} + R_{m1})}{R_{l1}(R_{g1} + R_{m1})} \tag{24}$$
$$= S_0\mu_0\left(\frac{(\beta - \theta)(B_r l_m + n(-I_a + I_b)\mu_m)}{l_m\mu_0 + (-x_g + l_g)\mu_m} - \frac{n(\alpha - \beta + \theta)(I_a - I_b)}{-x_g + l_g + l_m}\right)$$

$$\Phi_{m2} = \frac{F_2 + F_m}{R_{g2} + R_{m2}} \tag{25}$$
$$= \frac{(\beta + \theta)S_0\mu_0(B_r l_m - n(I_a + I_b)\mu_m)}{l_m\mu_0 + (-x_g + l_g)\mu_m}$$

$$\Phi_{l2} = \frac{F_2}{R_{l2}} \tag{26}$$
$$= -\left(\frac{n(\alpha - \beta - \theta)(I_a + I_b)S_0\mu_0}{-x_g + l_g + l_m}\right)$$

$$\Phi_2 = \frac{F_m R_{l2} + F_2(R_{g2} + R_{l2} + R_{m2})}{R_{l2}(R_{g2} + R_{m2})} \tag{27}$$
$$= S_0\mu_0\left(\frac{(\beta + \theta)(B_r l_m - n(I_a + I_b)\mu_m)}{l_m\mu_0 + (-x_g + l_g)\mu_m} - \frac{n(\alpha - \beta - \theta)(I_a + I_b)}{-x_g + l_g + l_m}\right)$$

Accordingly, the magnetic flux $\Phi_a$, $\Phi_b$, and $\Phi_m$ that interlink the armature winding currents $I_a$ and $I_b$ and the equivalence magnetization current $I_m = F_m$ are expressed by equations (28) to (30) below by considering the bipole number and the layer number.

$$\Phi_a = -2pqn(\Phi_1 + \Phi_2) \tag{28}$$
$$= -4pqnS_0\mu_0\left(\frac{(\beta B_r l_m - n(\beta I_a + \theta I_b)\mu_m)}{l_m\mu_0 + (-x_g + l_g)\mu_m} - \frac{n((\alpha - \beta)I_a - \theta I_b)}{-x_g + l_g + l_m}\right)$$

$$\Phi_b = 2qn(\Phi_1 - \Phi_2) \tag{29}$$
$$= 4pqnS_0\mu_0\left(\frac{(-\theta B_r l_m + n(\theta I_a + \beta I_b)\mu_m)}{l_m\mu_0 + (-x_g + l_g)\mu_m} - \frac{n(\theta I_a - (\alpha - \beta)I_b)}{-x_g + l_g + l_m}\right)$$

$$\Phi_m = 2pq(\Phi_{m1} + \Phi_{m2}) \tag{30}$$
$$= \frac{4pqS_0\mu_0(\beta B_r l_m - n(\beta I_a + \theta I_b)\mu_m)}{l_m\mu_0 + (-x_g + l_g)\mu_m}$$

For the sake of simplification, supposing that the magnetic permeability $\mu_m$ of the permanent magnet is equal to the magnetic permeability $\mu_0$ of a vacuum, the total magnetic energy in region (A) is expressed by equations (31) and (32) below.

$$W_0 = \frac{I_a\Phi_a + I_b\Phi_b + I_m\Phi_m}{2} \tag{31}$$

$$= \frac{2pqS_0\mu_0}{-x_g + l_g + l_m}\left(\beta\left(\frac{B_r l_m}{\mu_0}\right)^2 - 2n\frac{B_r l_m}{\mu_0} \times \right. \tag{32}$$
$$\left.(\beta I_a + \theta I_b) + n^2\alpha(I_a^2 + I_b^2)\right)$$

Similarly, the total magnetic energy in region (B) is expressed by equations (33) and (34) below.

$$W_0' = \frac{I_a'\Phi_a' + I_b'\Phi_b' + I_m'\Phi_m'}{2} \tag{33}$$

$$= \frac{2pqS_0\mu_0}{x_g + l_g + l_m}\left(\beta\left(\frac{B_r l_m}{\mu_0}\right)^2 - 2n\frac{B_r l_m}{\mu_0} \times \right. \tag{34}$$
$$\left.(\beta I_a' + \theta I_b') + n^2\alpha(I_a'^2 + I_b'^2)\right)$$

Accordingly, the total magnetic energy rendered by combining regions (A) and (B) is shown by equation (35) below.

$$W = W_0 + W_0' \tag{35}$$
$$= \frac{2pqS_0\mu_0}{(-x_g + l_g + l_m)(x_g + l_g + l_m)} \times \left(2\beta\left(\frac{B_r l_m}{\mu_0}\right)^2(l_g + l_m) - \right.$$
$$2n\frac{B_r l_m}{\mu_0}((\beta I_a' + \theta I_b')(-x_g + l_g + l_m) +$$
$$(\beta I_a + \theta I_b)(x_g + l_g + l_m)) + n^2\alpha((I_a'^2 + I_b'^2)$$
$$\left.(-x_g + l_g + l_m) + (I_a^2 + I_b^2)(x_g + l_g + l_m))\right)$$

The drive force f and torque $\tau$ can be found when the magnetic energy W is partially differentiated with a displacement $x_g$ and angle of rotation $\theta$ and are expressed by equations (36) and (37) respectively below.

$$f = \frac{\partial W}{\partial x_g} \quad (36)$$

$$= \frac{2pqS_0\mu_0}{(-x_g+l_g+l_m)^2(x_g+l_g+l_m)^2} \times \left(4x_g\beta\left(\frac{B_r l_m}{\mu_0}\right)^2(l_g+l_m) + \right.$$

$$2n\frac{B_r l_m}{\mu_0}((\beta I_a' + \theta I_b')(-x_g+l_g+l_m)^2 - (\beta I_a+\theta I_b)$$

$$(x_g+l_g+l_m)^2) - n^2\alpha((I_a'^2 + I_b'^2)(-x_g+l_g+l_m)^2 -$$

$$\left.(I_a^2+I_b^2)(x_g+l_g+l_m)^2)\right)$$

$$\tau = \frac{\partial W}{\partial \theta} \quad (37)$$

$$= -4pqnB_r l_m S_0 \left(\frac{I_b}{-x_g+l_g+l_m} + \frac{I_b'}{x_g+l_g+l_m}\right)$$

Thereafter, the drive force in mode 2 is found. With regard to the drive force in a case where the angle of rotation θ is within the range $(\alpha-\beta)=\theta=\beta$, the respective magnetic resistances from FIG. 14 are expressed by equations (38) to (44) below.

$$R_{g11} = \frac{-x_g+l_g}{(-\alpha+\beta+\theta)S_0\mu_0} \quad (38)$$

$$R_{g12} = \frac{-x_g+l_g}{(\beta-\theta)S_0\mu_0} \quad (39)$$

$$R_{m11} = \frac{l_m}{(-\alpha+\beta+\theta)S_0\mu_m} \quad (40)$$

$$R_{m12} = \frac{l_m}{(\beta-\theta)S_0\mu_m} \quad (41)$$

$$R_{l1} = \frac{-x_g+l_g+l_m}{2(\alpha-\beta)S_0\mu_0} \quad (42)$$

$$R_{g2} = \frac{-x_g+l_g}{\alpha S_0\mu_0} \quad (43)$$

$$R_{m2} = \frac{l_m}{\alpha S_0\mu_m} \quad (44)$$

Meanwhile, the equations for the magnetic circuit are expressed by equations (45) to (49) below from FIG. 15.

$$-F_1+F_m+R_{g11}\Phi_{m1}+R_{m11}\Phi_{m1}=0 \quad (45)$$

$$-F_1-F_m+R_{g12}\Phi_{m2}+R_{m12}\Phi_{m2}=0 \quad (46)$$

$$-F_1+R_{l1}\Phi_{l1}=0 \quad (47)$$

$$\Phi_{l1}+\Phi_{m1}+\Phi_{m2}=\Phi_1 \quad (48)$$

$$-F_2-F_m+R_{g2}\Phi_2+R_{m2}\Phi_2=0 \quad (49)$$

When the magnetic flux is found therefrom, same is expressed by equations (50) to (54) below.

$$\Phi_1 = \frac{F_1}{R_{l1}} + \frac{F_1-F_m}{R_{g11}+R_{m11}} + \frac{F_1+F_m}{R_{g12}+R_{m12}} \quad (50)$$

$$= \frac{-2n(\alpha-\beta)(I_a-I_b)S_0\mu_0}{-x_g+l_g+l_m} + \frac{S_0\mu_0}{l_m\mu_0+(-x_g+l_g)\mu_m}$$

$$((\alpha-2\theta)B_r l_m + n(\alpha-2\beta)(I_a-I_b)\mu_m)$$

$$\Phi_{m1} = \frac{F_1-F_m}{R_{g11}+R_{m11}} \quad (51)$$

$$= \frac{(\alpha-\beta-\theta)S_0\mu_0(B_r l_m + n(I_a-I_b)\mu_m)}{l_m\mu_0+(-x_g+l_g)\mu_m}$$

$$\Phi_{m2} = \frac{F_1+F_m}{R_{g12}+R_{m12}} \quad (52)$$

$$= \frac{(\beta-\theta)S_0\mu_0(B_r l_m + n(-I_a+I_b)\mu_m)}{l_m\mu_0+(-x_g+l_g)\mu_m}$$

$$\Phi_{l1} = \frac{F_1}{R_{l1}} \quad (53)$$

$$= \frac{-2n(\alpha-\beta)(I_a-I_b)S_0\mu_0}{-x_g+l_g+l_m}$$

$$\Phi_2 = \frac{F_2+F_m}{R_{g2}+R_{m2}} \quad (54)$$

$$= \frac{\alpha S_0\mu_0(B_r l_m - n(I_a+I_b)\mu_m)}{l_m\mu_0+(-x_g+l_g)\mu_m}$$

Accordingly, the magnetic flux $\Phi_a$, $\Phi_b$, and $\Phi_m$, that interlink the armature winding currents $I_a$ and $I_b$ and the equivalence magnetization current $I_m=F_m$ are expressed by equations (55) to (57) below by considering the bipole number and layer number.

$$\Phi_a = -2pqn(\Phi_1+\Phi_2) \quad (55)$$

$$= 4pqn\left(\frac{n(\alpha-\beta)(I_a-I_b)S_0\mu_0}{-x_g+l_g+l_m} - \right.$$

$$\left.\frac{S_0\mu_0((\alpha-\theta)B_r l_m - n(\beta I_a+(\alpha-\beta)I_b)\mu_m)}{l_m\mu_0+(-x_g+l_g)\mu_m}\right)$$

$$\Phi_b = 2pqn(\Phi_1-\Phi_2) \quad (56)$$

$$= 4pqn\left(\frac{-n(\alpha-\beta)(I_a-I_b)S_0\mu_0}{-x_g+l_g+l_m} - \right.$$

$$\left.\frac{S_0\mu_0(\theta B_r l_m - n((\alpha-\beta)I_a+\beta I_b)\mu_m)}{l_m\mu_0+(-x_g+l_g)\mu_m}\right)$$

$$\Phi_m = 2pq(-\Phi_{m1}+\Phi_{m2}+\Phi_2) \quad (57)$$

$$= \frac{4pqS_0\mu_0(\beta B_r l_m - n(\alpha-\theta)(I_a-I_b)\mu_m)}{l_m\mu_0+(-x_g+l_g)\mu_m}$$

For the sake of simplification, supposing that the magnetic permeability $\mu_m$ of the permanent magnet is equal to the magnetic permeability $\mu_0$ of a vacuum, the total magnetic energy in region (A) is expressed by equations (58) and (59) below.

$$W_0 = \frac{I_a\Phi_a+I_b\Phi_b+I_m\Phi_m}{2} \quad (58)$$

$$= \frac{2pqS_0\mu_0}{-x_g+l_g+l_m}\left(\beta\left(\frac{B_r l_m}{\mu_0}\right)^2 - 2n\frac{B_r l_m}{\mu_0}((\alpha-\theta)I_a+\theta I_b) + \right. \quad (59)$$

$$\left. n^2\alpha(I_a^2+I_b^2)\right)$$

Similarly, the total magnetic energy in region (B) is expressed by equations (60) and (61) below.

$$W'_0 = \frac{I_a \Phi_a + I_b \Phi_b + I_m \Phi_m}{2} \tag{60}$$

$$= \frac{2pqS_0\mu_0}{x_g + l_g + l_m}\left(\beta\left(\frac{B_r l_m}{\mu_0}\right)^2 - 2n\frac{B_r l_m}{\mu_0}((\alpha - \theta)I_a + \theta I_b) + \right. \tag{61}$$

$$\left. n^2\alpha(I_a^2 + I_b^2)\right)$$

Accordingly, the total magnetic energy rendered by combining regions (A) and (B) is shown by equation (62) below.

$$W = W_0 + W'_0 \tag{62}$$

$$= \frac{2pqS_0\mu_0}{(-x_g + l_g + l_m)(x_g + l_g + l_m)} \times \left(2\beta\left(\frac{B_r l_m}{\mu_0}\right)^2(l_g + l_m) - \right.$$

$$2n\frac{B_r l_m}{\mu_0}(((\alpha - \theta)I'_a + \theta I'_b)(-x_g + l_g + l_m) +$$

$$((\alpha - \theta)I_a + \theta I_b)(x_g + l_g + l_m)) +$$

$$\left. n^2\alpha((I'^2_a + I'^2_b)(-x_g + l_g + l_m) + (I^2_a + I^2_b)(x_g + l_g + l_m))\right)$$

Similarly to mode 1, the drive force f and torque τ can be found when the magnetic energy W is partially differentiated with a displacement $x_g$ and angle of rotation θ and are expressed by equations (63) and (64) respectively below.

$$f = \frac{\partial W}{\partial x_g} \tag{63}$$

$$= \frac{2pqS_0\mu_0}{(-x_g + l_g + l_m)^2(x_g + l_g + l_m)^2} \times$$

$$\left(4x_g\beta\left(\frac{B_r l_m}{\mu_0}\right)^2(l_g + l_m) + 2n\frac{B_r l_m}{\mu_0}(((\alpha - \theta)I'_a + \theta I'_b)\right.$$

$$(-x_g + l_g + l_m)^2 - ((\alpha - \theta)I_a + \theta I_b)(x_g + l_g + l_m)^2) -$$

$$\left. n^2\alpha((I'^2_a + I'^2_b)(-x_g + l_g + l_m)^2 - (I^2_a + I^2_b)(x_g + l_g + l_m)^2)\right)$$

$$\tau = \frac{\partial W}{\partial \theta} \tag{64}$$

$$= 4pqnB_r l_m S_0\left(\frac{I_a - I_b}{-x_g + l_g + l_m} + \frac{I'_a - I'_b}{x_g + l_g + l_m}\right)$$

Here, one numerical example of the spiral linear motor of the present invention is shown.

A numerical example in a case where the outer diameter is 60 [mm], the center shaft diameter is 10 [mm], the gap length is 1 [mm], and the permanent magnet thickness is 2 [mm] is expressed by equations (65) to (74) below.

$$l_g = 0.001 [mm] \tag{65}$$

$$l_m = 0.002 [mm] \tag{66}$$

$$\alpha = \pi/4 [rad] \tag{67}$$

$$\beta = \pi/6 [rad] \tag{68}$$

$$S_0 = 0.03^2 - 0.005^2 [m^2] \tag{69}$$

$$\mu_0 = \mu_m = 4\pi \times 10^{-7} \tag{70}$$

$$B_r = 1 [T] \tag{71}$$

$$n = 20 (\text{turn}) \tag{72}$$

$$p = 2 (\text{layer number}) \tag{73}$$

$$q = 5 (\text{bipole number}) \tag{74}$$

Here, the drive force f and torque τ when the displacement $x_g = 0$ [mm] are expressed by equations (75) and (76) respectively below.

$$f = \begin{cases} -81.4(I_a - I'_a) - 156\theta(I_b - I'_b) + \\ \quad 0.768(I_a^2 + I_b^2 - I'^2_a - I'^2_b) \\ \quad \text{if } -(\alpha - \beta) \leq \theta \leq \alpha - \beta \\ -(122 - 156\theta)(I_a - I'_a) + \\ \quad (61.1 - 156\theta)(I_b - I'_b) + \\ \quad 0.768(I_a^2 - I_a I_b - I'^2_a + I'_a I'_b) \\ \quad \text{if } \alpha - \beta \leq \theta \leq \beta \end{cases} \tag{75}$$

$$\tau = \begin{cases} -0.467(I_b + I'_b) \\ \quad \text{if } -(\alpha - \beta) \leq \theta \leq \alpha - \beta \\ 0.467(I_a - I_b + I'_a - I'_b) \\ \quad \text{if } \alpha - \beta \leq \theta \leq \beta \end{cases} \tag{76}$$

Further, the drive force f and torque τ when the displacement $x_g = 0.001$ [mm] are expressed by equations (77) and (78) respectively below.

$$f = \begin{cases} 5470 - 183I_a - 350\theta I_b + 45.8I'_a + 87.5\theta I'_b + \\ \quad 1.73(I_a^2 + I_b^2) - 0.432(I'^2_a + I'^2_b) \\ \quad \text{if } -(\alpha - \beta) \leq \theta \leq \alpha - \beta \\ 5470 - (275 - 350\theta)I_a + (137 - 350\theta)I_b + \\ \quad (68.7 - 87.5\theta)I'_a - (34.3612 - 87.5\theta)I'_b + \\ \quad 1.73(I_a^2 - I_a I_b) - 0.432(I'^2_a - I'_a I'_b) \\ \quad \text{if } \alpha - \beta \leq \theta \leq \beta \end{cases} \tag{77}$$

$$\tau = \begin{cases} -0.7I_b - 0.35I'_b \\ \quad \text{if } -(\alpha - \beta) \leq \theta \leq \alpha - \beta \\ 0.7(I_a - I_b) + 0.35(I'_a - I'_b) \\ \quad \text{if } \alpha - \beta \leq \theta \leq \beta \end{cases} \tag{78}$$

The constant term expressed in the above equations is the force with which the permanent magnet attracts the iron core and, when the rotator is in the dead center of the gap of the stator, that is, when the displacement $x_g = 0$ [mm], the forces of the permanent magnets on both sides of the rotator cancel each other out to zero. However, when the rotator touches down on one of the permanent magnets of the stator, that is, when the displacement $x_g = 1$ [mm], the force of attraction of the permanent magnet on the touched side is dominant and a force of attraction of as many as 5740 [N] is produced. A current of 28.5 [A] or more must be made to flow in order to allow the rotator to rise by overcoming this force of attraction.

By introducing a stopper so that the gap is not smaller than a certain value, the damage of the permanent magnet caused by touch-down can be prevented and the current required for the rotator to rise can be reduced. For example, when a stopper that prevents displacement of more than 0.5 [mm] is used, the drive force f and torque r for a maximum displacement $x_g = 0.0005$ [m] are shown by the equations (79) and (80) below.

$$f = \begin{cases} 2290 - 117I_a - 224\theta I_b + 59.8I'_a + 114\theta I'_b + \\ \quad 1.11(I_a^2 + I_b^2) - 0.564(I_a'^2 + I_b'^2) \\ \quad \text{if } -(\alpha-\beta) \le \theta \le \alpha-\beta \\ 2290 - (176 - 224\theta)I_a + (88.0 - 224\theta)I_b + \\ \quad (89.8i_c - 114\theta)I'_c - (44.9i_d - 114\theta)I'_b + \\ \quad 1.11(I_a^2 - I_a I_b) - 0.564(I_a'^2 - I'_a I'_b) \\ \quad \text{if } \alpha-\beta \le \theta \le \beta \end{cases} \quad (79)$$

$$\tau = \begin{cases} -0.56I_b - 0.4I'_b \\ \quad \text{if } -(\alpha-\beta) \le \theta \le \alpha-\beta \\ 0.56(I_a - I_b) + 0.4(I'_a - I'_b) \\ \quad \text{if } \alpha-\beta \le \theta \le \beta \end{cases} \quad (80)$$

In this case, a rise is possible as a result of a current of 15.2 [A] or more being made to flow.

When the gap is controlled for $x_g=0$ so that the rotator is dead center of the stator, even given an angle of rotation $\theta=a/2$, which makes it difficult to output the maximum drive force, the drive force constant is 122 [n/A] and, supposing that a current of 10 [A] flows, a force of 1200 [N] or more can be produced.

Circuit equations for the spiral linear motor of the present invention will be described next. Supposing that the armature resistance is R and the application voltages of each phase $V_a$, $V_b$, $V'_a$, and $V'_b$ respectively, the sum of the application voltages and induced electromotive force is added to the resistance and the circuit equations expressed by equations (81) to (84) below are established.

$$V_a - \dot{\Phi}_a = RI_a \quad (81)$$

$$V_b - \dot{\Phi}_b = RI_b \quad (82)$$

$$V'_a - \dot{\Phi}'_a = RI'_a \quad (83)$$

$$V'_b - \dot{\Phi}'_b = RI'_b \quad (84)$$

, where $\dot{\Phi}_a = d\Phi_a/dt$.

For the sake of simplification, $\mu_m = \mu_0$ and the induced electromotive force of the second term on the left side of the above equation is found.

In the case of mode 1, by time-differentiating both sides of the equations (28) and (29), the induced electromotive force expressed by equations (85) and (86) below is found.

$$\dot{\Phi}_a = \frac{4pqn^2 \alpha S_0 \mu_0}{-x_g + l_g + l_m} \dot{I}_a - \frac{4pqnS_0(\beta B_r l_m - n\alpha I_a \mu_0)}{(-x_g + l_g + l_m)^2} \dot{x}_g \quad (85)$$

$$\dot{\Phi}_b = \frac{4pqn^2 \alpha S_0 \mu_0}{-x_g + l_g + l_m} \dot{I}_b - \frac{4pqnS_0(\theta B_r l_m - n\alpha I_a \mu_0)}{(-x_g + l_g + l_m)^2} \dot{x}_g - \frac{4pqn^2 B_r l_m S_0}{-x_g + l_g + l_m} \dot{\theta} \quad (86)$$

Furthermore, in the case of mode 2, by time-differentiating both sides of the equations (55) and (56), the induced electromotive force expressed by equations (87) and (88) below is found.

$$\dot{\Phi}_a = \frac{4pqn^2 \alpha S_0 \mu_0}{-x_g + l_g + l_m} \dot{I}_a - \frac{4pqnS_0((\alpha-\theta)B_r l_m - n\alpha I_a \mu_0)}{(-x_g + l_g + l_m)^2} \dot{x}_g + \frac{4pqn^2 B_r l_m S_0}{-x_g + l_g + l_m} \dot{\theta} \quad (87)$$

$$\dot{\Phi}_b = \frac{4pqn^2 \alpha S_0 \mu_0}{-x_g + l_g + l_m} \dot{I}_b - \frac{4pqnS_0(\theta B_r l_m - n\alpha I_a \mu_0)}{(-x_g + l_g + l_m)^2} \dot{x}_g - \frac{4pqn^2 B_r l_m S_0}{-x_g + l_g + l_m} \dot{\theta} \quad (88)$$

Figure 16:
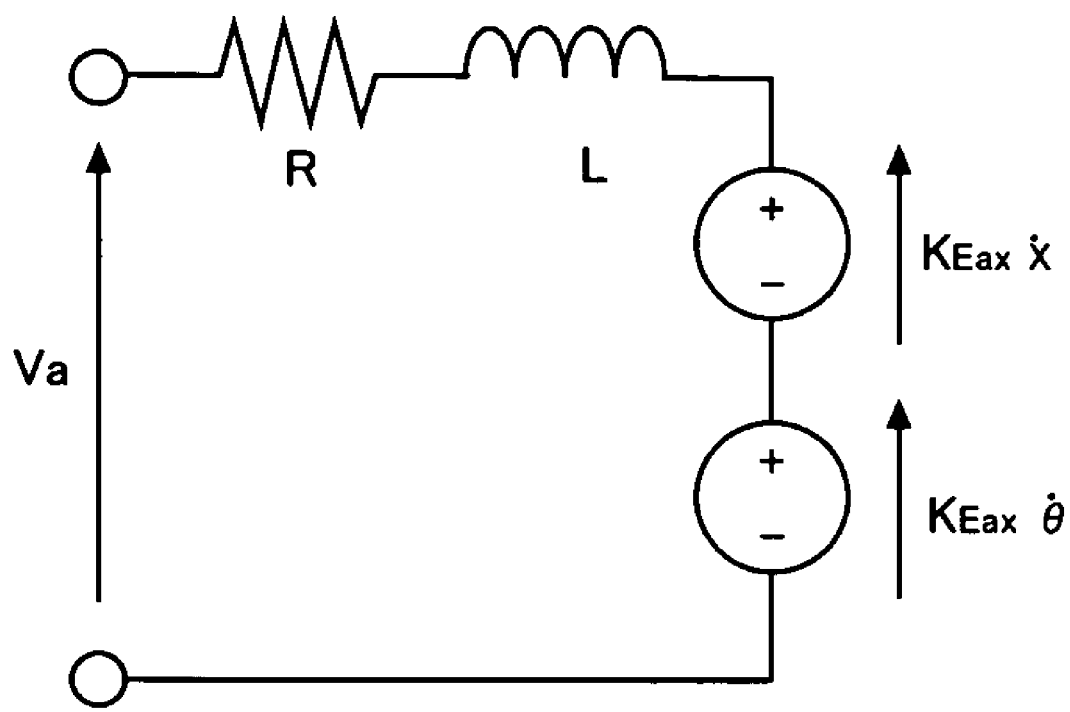
FIG. 16 is an armature circuit of the spiral linear motor of the present invention.

When the above equations are put in order, the induced electromotive force is expressed by equations (89) and (90) below. Further, FIG. 16 shows the armature circuit represented by equation (89).

$$V_a = RI_a + L\dot{I}_a + K_{Eax}\dot{x}_g + K_{Ea\theta}\dot{\theta} \quad (89)$$

$$V_b = RI_b + L\dot{I}_b + K_{Ebx}\dot{x}_g + K_{Eb\theta}\dot{\theta} \quad (90)$$

Where L is the armature inductance, $K_{Eax}$ and $K_{Ea\theta}$ are the induced voltage constants of phase A, and $K_{Ebx}$ and $K_{Eb\theta}$ are the induced voltage constants of phase B, which are expressed by equations (91) to (95) below.

$$L = \frac{4pqn^2 \alpha S_0 \mu_0}{-x_g + l_g + l_m} \quad (91)$$

$$K_{Eax} = \begin{cases} -\frac{4pqnS_0(\beta B_r l_m - n\alpha I_a \mu_0)}{(-x_g + l_g + l_m)^2} \\ \quad \text{if } -(\alpha-\beta) \le \theta \le \alpha-\beta \\ -\frac{4pqnS_0((\alpha-\theta)B_r l_m - n\alpha I_a \mu_0)}{(-x_g + l_g + l_m)^2} \\ \quad \text{if } \alpha-\beta \le \theta \le \beta \end{cases} \quad (92)$$

$$K_{Ea\theta} = \begin{cases} 0 & \text{if } -(\alpha-\beta) \le \theta \le \alpha-\beta \\ \frac{4pqn^2 B_r l_m S_0}{-x_g + l_g + l_m} & \text{if } \alpha-\beta \le \theta \le \beta \end{cases} \quad (93)$$

$$K_{Ebx} = -\frac{4pqnS_0(\theta B_r l_m - n\alpha I_a \mu_0)}{(-x_g + l_g + l_m)^2} \quad (94)$$

$$K_{Eb\theta} = -\frac{4pqn^2 B_r l_m S_0}{-x_g + l_g + l_m} \quad (95)$$

Further, similarly also for the winding of region (B), the induced electromotive force is expressed by equations (96) and (97) below.

$$V'_a = RI'_a + L'\dot{I}'_a + K'_{Eax}\dot{x}_g + K'_{Ea\theta}\dot{\theta} \quad (96)$$

$$V'_b = RI'_b + L'\dot{I}'_b + K'_{Ebx}\dot{x}_g + K'_{Eb\theta}\dot{\theta} \quad (97)$$

Where L', $K'_{Eax}$, $K'_{Ea\theta}$, $K'_{Ebx}$, and $K'_{Eb\theta}$ are expressed by equations (98) to (102) below.

$$L' = \frac{4pqn^2 \alpha S_0 \mu_0}{x_g + l_g + l_m} \quad (98)$$

-continued $$K'_{Eax} = \begin{cases} -\dfrac{4pqnS_0(\beta B_r l_m - n\alpha I_a \mu_0)}{(x_g + l_g + l_m)^2} \\ \text{if } -(\alpha - \beta) \le \theta \le \alpha - \beta \\ -\dfrac{4pqnS_0((\alpha - \theta)B_r l_m - n\alpha I_a \mu_0)}{(x_g + l_g + l_m)^2} \\ \text{if } \alpha - \beta \le \theta \le \beta \end{cases} \quad (99)$$

$$K'_{Ea\theta} = \begin{cases} 0 & \text{if } -(\alpha - \beta) \le \theta \le \alpha - \beta \\ \dfrac{4pqn^2 B_r l_m S_0}{x_g + l_g + l_m} & \text{if } \alpha - \beta \le \theta \le \beta \end{cases} \quad (100)$$

$$K'_{Ebx} = -\dfrac{4pqnS_0(\theta B_r l_m - n\alpha I_a \mu_0)}{(x_g + l_g + l_m)^2} \quad (101)$$

$$K'_{Eb\theta} = -\dfrac{4pqn^2 B_r l_m S_0}{x_g + l_g + l_m} \quad (102)$$

Control of the spiral linear motor of the present invention will be described next. The spiral linear motor of the present invention is able to control the drive force f and torque $\tau$ independently.

In the theoretical equations (36) and (63) for the drive force, when it is assumed that the gap displacement $x_g$ is sufficiently small in comparison with an adequate reference gap $l_g$ and is made linear at about $x_g=0$ by ignoring second-order or higher terms, an approximation that is expressed by the equations (103) to (106) below is obtained.

$$-(\alpha - \beta) \le \theta \le \alpha - \beta \quad (103)$$

$$f \simeq \dfrac{8pqx_g \beta B_r^2 l_m^2 (l_g + l_m) S_0}{(-x_g + l_g + l_m)^2 (x_g + l_g + l_m)^2 \mu_0} - $$
$$\dfrac{4pqn\beta B_r l_m S_0}{(-x_g + l_g + l_m)^2} I_a - \dfrac{4pqn\theta B_r l_m S_0}{(-x_g + l_g + l_m)^2} I_b + $$
$$\dfrac{4pqn\beta B_r l_m S_0}{(x_g + l_g + l_m)^2} I'_a - \dfrac{4pqn\theta B_r l_m S_0}{(x_g + l_g + l_m)^2} I'_b$$

$$\tau = -\dfrac{4pqnB_r l_m S_0}{-x_g + l_g + l_m} I_b - \dfrac{4nB_r l_m S_0}{x_g + l_g + l_m} I'_b \quad (104)$$

$$\alpha - \beta \le \theta \le \beta \quad (105)$$

$$f \simeq \dfrac{8pqx_g \beta B_r^2 l_m^2 (l_g + l_m) S_0}{(-x_g + l_g + l_m)^2 (x_g + l_g + l_m)^2 \mu_0} - $$
$$\dfrac{4pqn(\alpha - \theta)B_r l_m S_0}{(-x_g + l_g + l_m)^2} I_a - \dfrac{4pqn\theta B_r l_m S_0}{(-x_g + l_g + l_m)^2} I_b + $$
$$\dfrac{4pqn(\alpha - \theta)B_r l_m S_0}{(x_g + l_g + l_m)^2} I'_a + \dfrac{4pqn\theta B_r l_m S_0}{(x_g + l_g + l_m)^2} I'_b$$

$$\tau = 4pqnB_r l_m S_0 \left( \dfrac{I_a - I_b}{-x_g + l_g + l_m} + \dfrac{I'_a - I'_b}{x_g + l_g + l_m} \right) \quad (106)$$

When the above equations are generalized, same are expressed by the equations (107) and (108) below by using the drive force constant and torque constant.

$$f = f_0(x_g) + K_{fa}(x_g, \theta)I_a + K_{fb}(x_g, \theta)I_b + \quad (107)$$
$$K'_{fa}(x_g, \theta)I'_a + K'_{fb}(x_g, \theta)I'_b$$

$$\tau = K_{ta}(x_g, \theta)I_a + K_{tb}(x_g, \theta)I_b + \quad (108)$$
$$K'_{ta}(x_g, \theta)I'_a + K'_{tb}(x_g, \theta)I'_b$$

In addition, a conclusion is expressed by equations (109) to (113) below.

$$F = F_0(x_g) + K(x_g, \theta)I, \text{ where} \quad (109)$$

$$F = \begin{bmatrix} f \\ \tau \end{bmatrix} \quad (110)$$

$$F_0 = \begin{bmatrix} f_0(x_g) \\ 0 \end{bmatrix} \quad (111)$$

$$K(x_g, \theta) = \begin{bmatrix} K_{fa}(x_g, \theta) & K_{fb}(x_g, \theta) & K'_{fa}(x_g, \theta) & K'_{fb}(x_g, \theta) \\ K_{ta}(x_g, \theta) & K_{tb}(x_g, \theta) & K'_{ta}(x_g, \theta) & K'_{tb}(x_g, \theta) \end{bmatrix} \quad (112)$$

$$I = \begin{bmatrix} I_a \\ I_b \\ I'_a \\ I'_b \end{bmatrix} \quad (113)$$

As a result, the control law expressed by equation (114) below is obtained.

$$I = H(x_g, \theta)(F^* - F_0) \quad (114)$$

Where $H(x_g, \theta)$ is a $K(x_g, \theta)$ pseudo inverse matrix that is defined by the equation (115) below.

$$H(x_g, \theta) = K(x_g, \theta)^\dagger \quad (115)$$
$$= K(x_g, \theta)^T (K(x_g, \theta)K(x_g, \theta)^T)^{-1}$$

Supposing that E is a unit matrix as a property of the pseudo inverse matrix, $K(X_g, \theta) H(X_g, \theta)=E$ is established. A solution in which the sum of squares is smallest in a combination in which the current thus obtained produces the desired drive force and torque is obtained.

Further, the current corresponding with the null-space of $K(X_g, \theta)$ does not contribute to the drive force and torque and is therefore an invalid current. The solution obtained with equation (114) does not contain an invalid component and is orthogonal to the invalid current.

Figure 17:
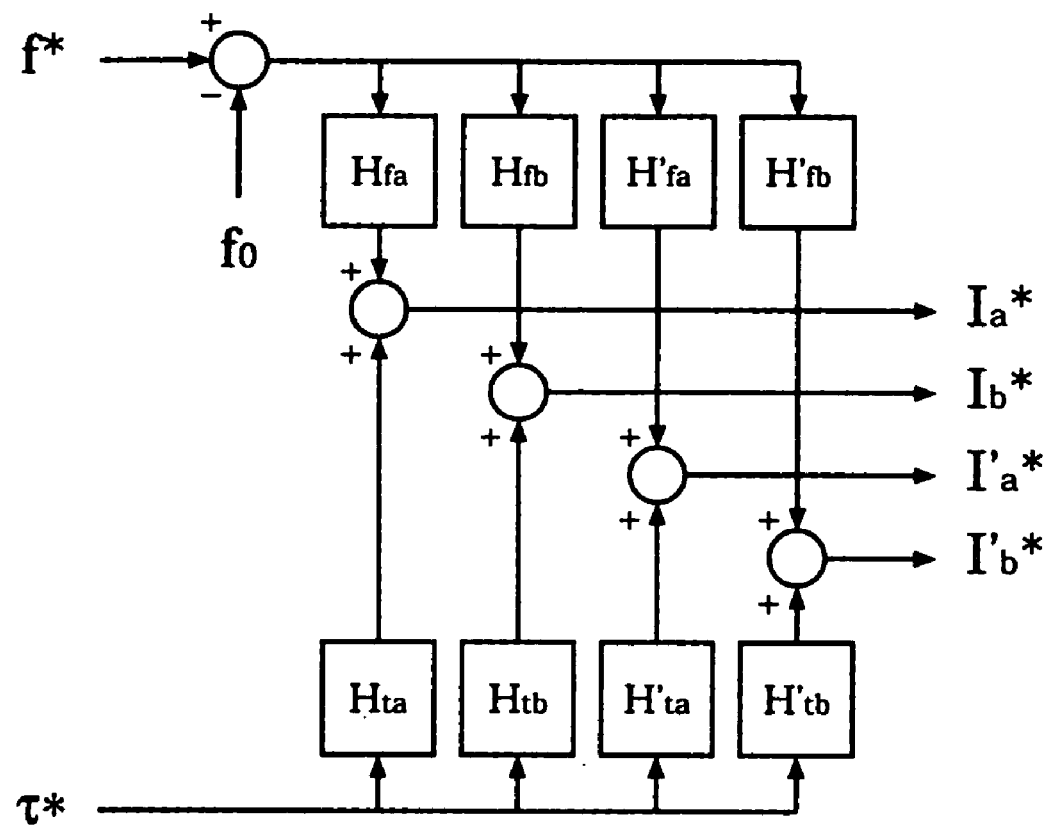
FIG. 17 is a drive force/torque to current converter that is applied to the spiral linear motor of the present invention.

By using the drive force/torque to current converter shown in FIG. 17, the currents $I_a^*$, $I_b^*$, $I'_a^*$, and $I'_b^*$ of each phase can be found from the order values $f^*$ and $\tau^*$ of the drive force and torque respectively.

As a result, the drive force and torque of the spiral linear motor of the present invention can each be controlled independently.

In the spiral linear motor of the present invention, in order to produce a drive force while avoiding touch-down, a target value generator that supplies a torque target value that counterbalances the desired drive force at the top of the independent control system for the torque and drive force.

Supposing that the direction of movement is the x axis, an equation for the spiral curved face is described with $\theta$ as the intermediary variable as per the equations (116) to (118) below.

$$x = l_p \frac{\theta}{2\pi} \quad (116)$$

$$y = r\cos\theta \quad (117)$$

$$z = r\sin\theta \quad (118)$$

Where $l_p$ is the pitch of the spiral. That is, there is a progression of $l_p$ [m] for every revolution. Here, the inclination $\tan\phi$ (r) of the spiral curved face at a point on radius r is given by the equation (119) below.

$$\tan\phi(r) = \frac{\partial x}{\partial (r\theta)} = \frac{l_p}{2\pi r} \quad (119)$$

Similarly to a normal screw, the relationship between the drive force and torque when motion is restricted at the spiral face can be found as follows.

Figure 18:
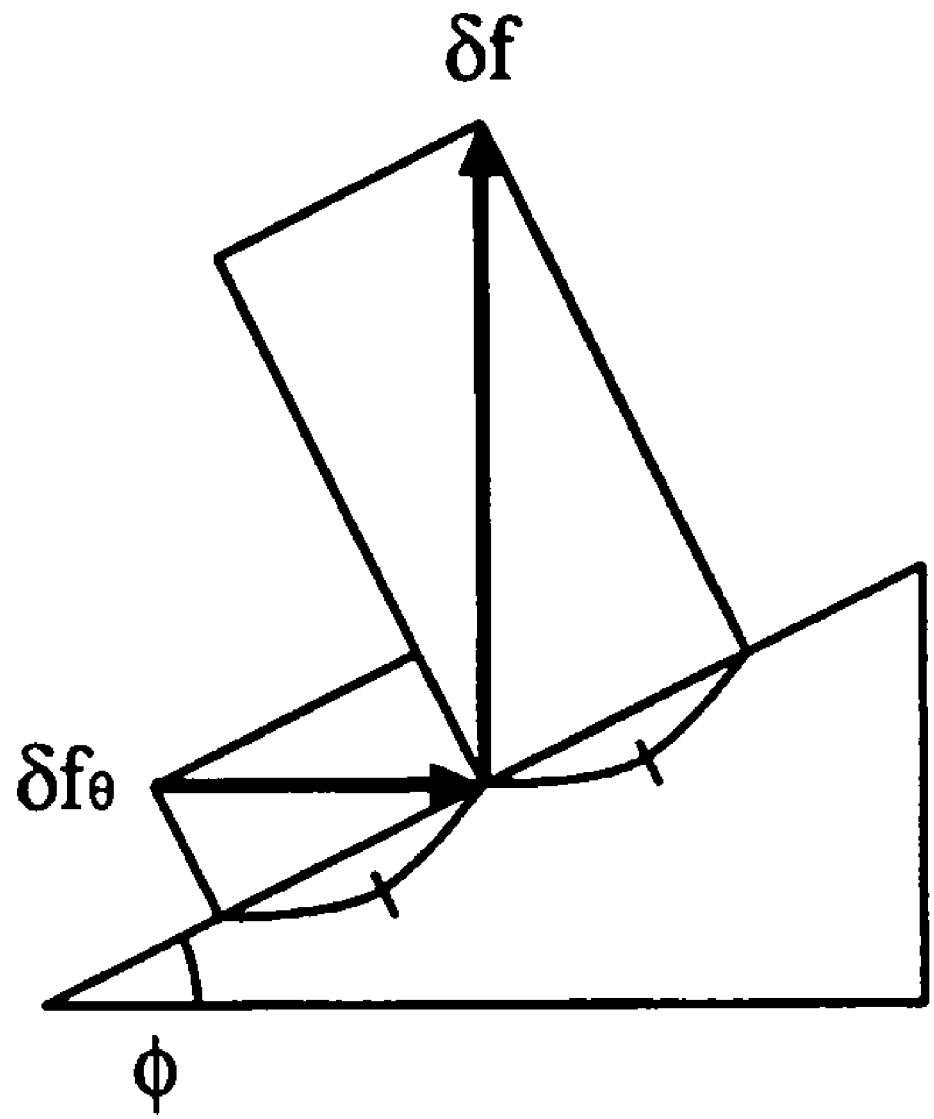
FIG. 18 serves to illustrate the relationship between a force dfθ that is applied in a rotational direction of the spiral face and a force df that acts in the direction of movement.

When no friction exists at all, the relationship between the force $\delta f\theta$ applied in the direction of rotation at the spiral face and the force $\delta f$ acting in the direction of movement via the normal force due to this force is shown in FIG. 18 and is given by equation (120) below.

$$\delta f = \frac{1}{\tan\phi(r)}\delta f_\theta = \frac{2\pi r}{l_p}\delta f_\theta \quad (120)$$

Supposing that $\delta r \to 0$ when both sides are divided by $\delta r$, the relationship expressed by equation (121) below is obtained.

$$\frac{\partial f}{\partial r} = \left(\frac{2\pi r}{l_p}\right)\frac{\partial f_\theta}{\partial r} \quad (121)$$

On the other hand, the distribution of the force in the direction of rotation can be found and the relationship between the drive force and torque can be derived from the torque found by equations (37) and (64).

First, the torque that is found by equations (37) and (64) can be expressed by the equations (122) to (124) below.

$$\tau = T(x_g, \theta)S_0 \quad (122)$$

$$= T(x_g, \theta)(r_2^2 - r_1^2), \text{ where} \quad (123)$$

$$T(x_g, \theta) = \begin{cases} -4nB_r l_m\left(\frac{l_b}{-x_g + l_g + l_m} + \frac{l'_b}{x_g + l_g + l_m}\right) \\ \quad \text{if } -(\alpha - \beta) \le \theta \le \alpha - \beta \\ 4nB_r l_m\left(\frac{l_a - l_b}{-x_g + l_g + l_m} + \frac{l'_a - l'_b}{x_g + l_g + l_m}\right) \\ \quad \text{if } \alpha - \beta \le \theta \le \beta \end{cases} \quad (124)$$

The torque $\delta\tau$ that is produced by the minute region of $r+\delta r$ from radius r can be expressed by equation (125) below from the above equations.

$$\delta\tau = T(x_g, \theta)((r+\delta r)^2 - r^2) \quad (125)$$
$$= T(x_g, \theta)(2r + \delta r)\delta r$$

Therefore, the force in the direction of rotation that is produced by the minute region of $r+\delta r$ from radius r is expressed by equation (126) below.

$$\delta f_\theta = \frac{\delta\tau}{r} = T(x_g, \theta)\frac{(2r + \delta r)}{r}\delta r \quad (126)$$

Accordingly, the rotational force per unit length with respect to the radial direction at a point a distance r from the center is given by equation (127) below.

$$\frac{\partial f_\theta}{\partial r} = \lim_{\delta r \to 0}\frac{\delta f_\theta}{\delta r} = \lim_{\delta r \to 0}T(x_g, \theta)\frac{(2r + \delta r)}{r} = 2T(x_g, \theta) \quad (127)$$

Therefore, the drive force in a case where motion is restricted to the spiral face is rendered by the equations (128) and (129) below from the equations (121) and (127).

$$f = \int_{r1}^{r2}\frac{\partial f}{\partial r}dr \quad (128)$$
$$= \int_{r1}^{r2}\left(\frac{2\pi r}{l_p}\right)\frac{\partial f_\theta}{\partial r}dr$$
$$= \int_{r1}^{r2}\left(\frac{2\pi r}{l_p}\right)(2T(x_g, \theta))dr$$
$$= \frac{2\pi}{l_p}T(x_g, \theta)(r_2^2 - r_1^2)$$
$$= \frac{2\pi}{l_p}T(x_g, \theta)S_0$$
$$= \frac{2\pi}{l_p}\tau$$

That is $$\tau = \frac{l_p}{2\pi}f \quad (129)$$

In an ideal state, it is necessary to ensure that the target value of the torque and drive force thus produced satisfy the relationship of the above equations.

This relationship can also be found from the principle of virtual work. That is, this relationship can also be found by solving the constraint equation expressed by the equation (130) below being obtained by time differentiating both sides of equation (116).

$$\dot{x}_g = \left(\frac{l_p}{2\pi}\right)\dot{\theta} \quad (130)$$

and restriction equation for holding instantaneous power expressed by equation (121) below.

$$\dot{x}_g = \dot{\theta}_\tau \quad (131)$$

this equation and equation being obtained by time-differentiating both sides of equation (116).

In the case of spiral linear motor of the present invention, the gap $x_g$ must always be kept at zero to prevent touchdown of the rotator. Therefore, assuming that the mass of the rotator is M, the dynamics of the rotator, which is a double integral expressed by equation (132) below.

$$M\ddot{x}_g = f \quad (132)$$

can be controlled by designing a stabilization compensator (regulator). When the above equation represents a transfer function, same is expressed by the equation (133) below.

$$x_g = \frac{1}{Ms^2} f \quad (133)$$

The stabilization compensator $C_g$ (s) performs gap control by means of the equation (134) below.

$$f = -C_g(s)x_g \quad (134)$$

A variety of procedures such as PI control, state feedback+observer, H8 control, can be applied for the design of the stabilization compensator $C_g$ (s).

Figure 19:
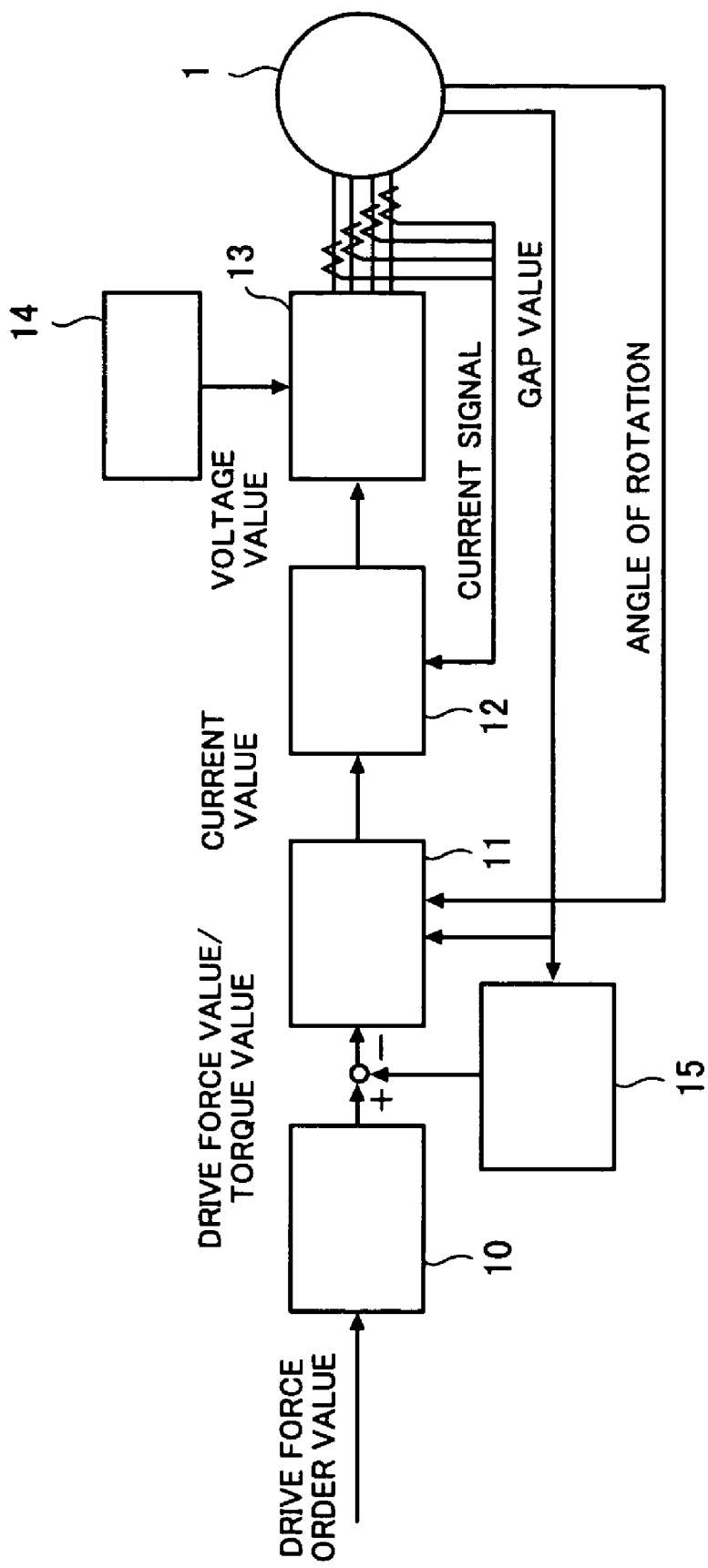
FIG. 19 is a block diagram of the drive force control system of the spiral linear motor of the present invention.
Figure 20:
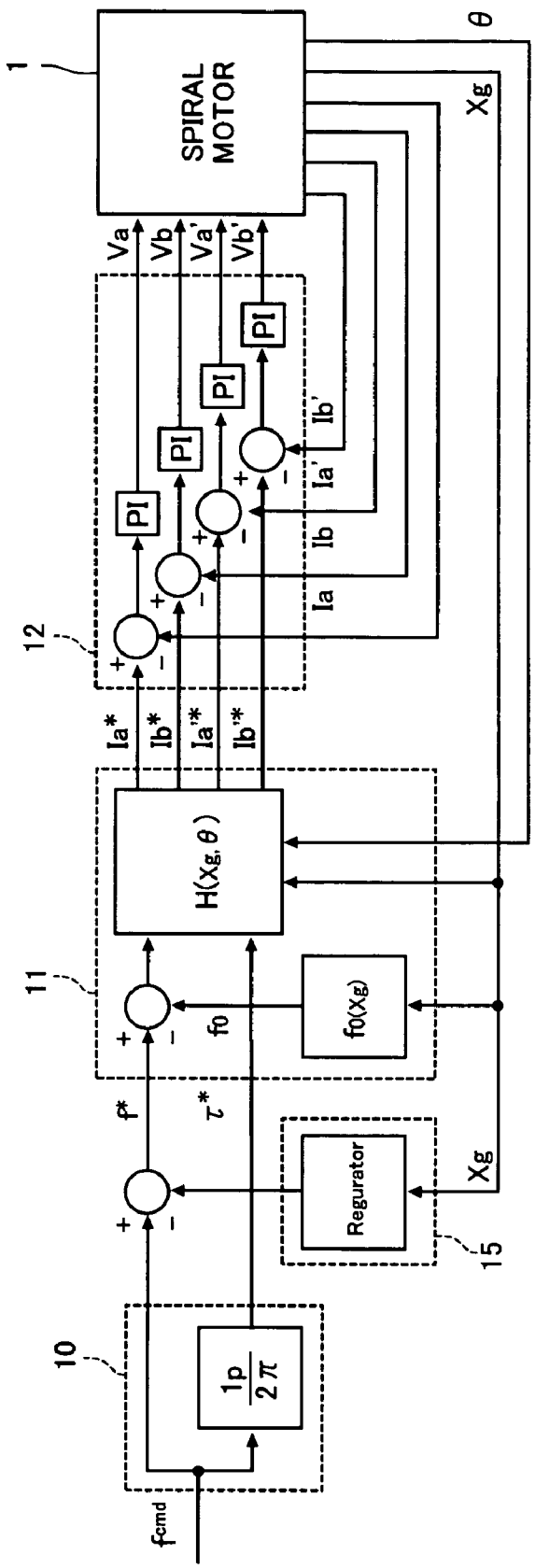
FIG. 20 is a detailed block diagram of the drive force control system of the spiral linear motor of the present invention.

The drive force control will be described next. FIG. 19 is a block diagram of the drive force control system and FIG. 20 is a detailed block diagram of the drive force control system.

In FIG. 19, the torque target value generator 10 finds the target values ($\tau^*$, $f^*$) for the torque and drive force from the order value of the drive force on the basis of the equation (129) above and inputs the target values to the drive force to current converter 11. Further, $f_0$ ($X_g$) is fed back negatively by using the gap value $X_g$, which is found by the gap sensor provided in the spiral linear motor 1, to the drive force to current converter 11. Further, the gap controller 15 performs stabilization compensation on the basis of the equation (134).

The drive force to current converter 11 uses the torque target value $\tau^*$ from the torque target value generator 10, the drive-force target value $f^*$, $f_0$ ($X_g$), the gap value $x_g$, and the angle of rotation $\theta$ of the rotator to find the current order values ($I_a^*$, $I_b^*$, $I'_a^*$, $I'_b^*$) on the basis of equation (114) and inputs these current order values to the current controller 12.

The current control device 12 performs PI control to form the voltage values ($V_a$, $V_b$, $V'_a$, $V'_b$) on the basis of the current order values ($I_a^*$, $I_b^*$, $I'_a^*$, $I'_b^*$) from the drive force to current converter 11 and the current values ($I_a$, $I_b$, $I'_a$, $I'_b$) supplied to the windings of the stator. An inverter 13 supplies power from the power supply 14 to the windings of the stator on the basis of the voltage order values.

Furthermore, in cases where the spiral linear motor of the present invention is applied to an actuator and alignment is performed by means of the actuator, a position control system is provided above the drive force control system.

The position control system will be described hereinbelow.

When it is assumed that the gap is kept at zero, the translational position of the rotator is determined can be uniquely determined. Therefore, the translational position of the rotator can be controlled by controlling the rotation angle of the rotator.

Supposing that the inertia moment of the rotator is J, the motion equations for the rotator are given by the equation (135) below.

$$J\ddot{\theta} = \tau \quad (135)$$

When equation (135) is rewritten by using the relationship of equations (116) and (129), this is given by equation below.

Therefore, robust servo control and so forth for which a servo-control system is designed is valid for the double integration control target in equation (136).

Figure 21:
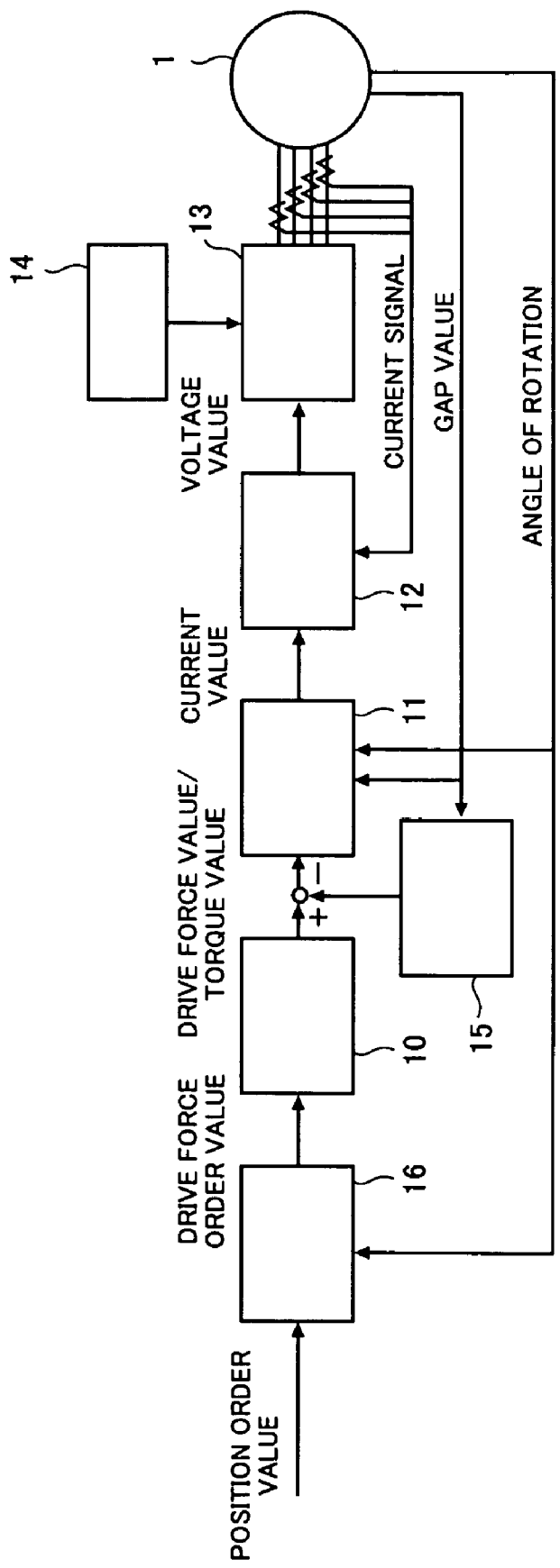
FIG. 21 is a block diagram of the positional control system of the spiral linear motor of the present invention.
Figure 22:
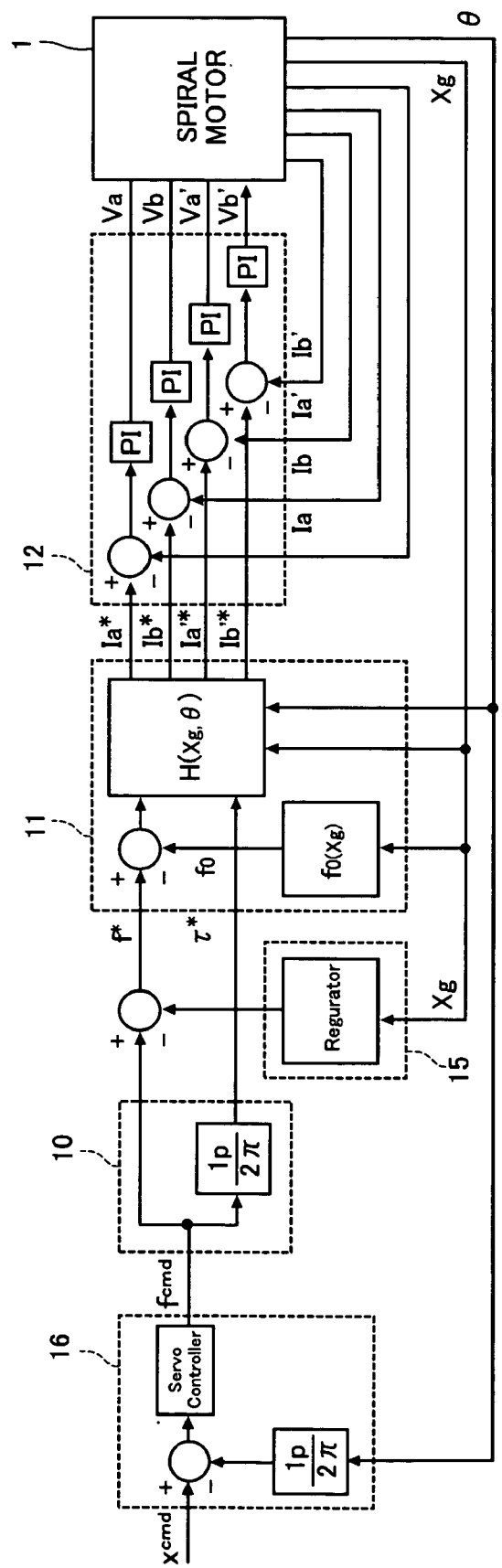
FIG. 22 is a detailed block diagram of the positional control system of the spiral linear motor of the present invention.

FIG. 21 is a block diagram of the positional control system and FIG. 22 is a detailed block diagram of the positional control system.

The illustrated positional control system comprises a positional controller 16 above the drive force control system. The positional controller 16 finds the deviation by inputting the positional order value $X^{cmd}$ and the rotational angle $\theta$ of the rotator, finds the order value of the drive force by means of servo control on the basis of the positional deviation thus found, and inputs this drive-force order value to the torque target value generator 10 of the drive force control system.

The spiral linear motor of the present invention makes it possible to produce a drive force in the axial direction during rotation and to obtain a large drive force in accordance with results similar to those for a reduction gear by affording the part producing the drive force a spiral shape.

Further, by reducing the pitch of the rotator and stator, the spiral linear motor can be rendered a high-rotation-type spiral linear motor and can be made miniature and lightweight.

Moreover, unlike a gear, the rotator and stator are contactless and there is no friction therebetween. Therefore, loss and backlash and so forth can be eliminated.

Further, because there is no static friction, highly precise alignment is possible, which is preferable for a device requiring precise alignment such as an NC machine.

INDUSTRIAL APPLICABILITY

As described hereinabove, according to the spiral linear motor of the present invention, a motor producing a rectilinear drive force can simultaneously be small and lightweight and have high accuracy and a large drive force.

The invention claimed is:

1. A spiral linear motor, comprising:
   a rotator including a center shaft having an axis and a spiral-shaped portion protruding in the radial direction, provided on the outer circumference of the center shaft; and
   a stator comprising hollow magnetic poles forming a center space having a spiral-shaped groove with the same pitch as the rotator,
   wherein the center shaft of the rotator is within the hollow magnetic poles forming a center space of the stator;
   the side face of the spiral-shaped portion of the rotator in the axial direction and the side face of the spiral-shaped groove of the stator in the axial direction are opposed to each other in a direction parallel with the axis of the center shaft;
   the spiral-shaped portion is rotatable in a spiral shape within the spiral-shaped groove of the hollow magnetic poles forming a center space; and
   the rotator moves linearly in the axial direction while rotating in a spiral shape with respect to the stator.

2. The spiral linear motor according to claim 1, wherein the rotator has a permanent magnet on the spiral side face of the spiral-shaped portion.

3. The spiral linear motor according to claim 1, wherein the stator has windings of two phases that are mutually displaced through 90 degrees on both spiral-shaped side faces of the mid-air gap magnetic pole wound in the axial direction of the stator.

4. The spiral linear motor according to claim 1, wherein
the stator has a slot on both spiral-shaped side faces of the mid-air magnetic pole; and
the winding is wound in the slot.

\* \* \* \* \*